United States Patent [19]

Take

[11] Patent Number: 5,640,554
[45] Date of Patent: Jun. 17, 1997

[54] PARALLEL MERGE AND SORT PROCESS METHOD AND SYSTEM THEREOF

[75] Inventor: Riichiro Take, Kawasaki, Japan

[73] Assignee: Fujitsu Limited, Kawasaki, Japan

[21] Appl. No.: 321,772

[22] Filed: Oct. 12, 1994

[30] Foreign Application Priority Data

Oct. 12, 1993 [JP] Japan ................................ 5-254393
Feb. 21, 1994 [JP] Japan ................................ 6-021678

[51] Int. Cl.$^6$ ...................................................... G06F 17/30
[52] U.S. Cl. ........................... 395/607; 395/675; 395/800
[58] Field of Search .................................. 395/600, 800, 395/650

[56] References Cited

U.S. PATENT DOCUMENTS

| | | | |
|---|---|---|---|
| 5,179,699 | 1/1993 | Iyer et al. | 395/650 |
| 5,265,260 | 11/1993 | Hendricks | 395/800 |
| 5,386,583 | 1/1995 | Hendricks | 395/800 |

OTHER PUBLICATIONS

Beck et al., "Sorting Large Files on a Backend Multiprocessor", IEEE Transactions on Computers, vol. 37, No. 7, Jul., 1988, pp. 769–778.
Guang–Sheen Liu et al., "Parallel Merge Module for Combining Sorted Lists", IEE Proceedings E (Computers and Digital Techniques); vol. 136, No. 3, May 1989, pp. 161–165.
Iyer et al., "System Issues in Parallel Sorting for DatabaseSystems", Sixth International Conference on Data Engineering, 5–9 Feb. 1990, pp. 246–255.
Varman et al., "An Efficient Multiprocessor Merge Algorithm", PARBASE-90, International Conference on Databases, ParallelArchitectures and Their Applications, 7–9 Mar. 1990, Miami beach Florida, pp. 276–283.
Guan et al., "Time–Space Optimal Parallel Merging and Sorting", IEEE Transactions on Computers, vol. 40, No. 5, May 1991, pp. 596–602.
Kelley McTiernan, "An end to the Mystery of Sorting, When You Can't Fit Every Element in Memory, Turn to This Algorithm", Computer Language, vol. 8, No. 7, Jul., 1991 pp. 57–69.
DeWitt et al., "Parallel Database Systems: The Future of High Performance Database Systems", Communications of the ACM, vol. 35, No. 6, Jun. 1992, pp. 85–98.
Liszka et al., "A Modulo Merge Sorting Network", Fourth Symposiumon the Frontiers of Massively Parallel Computation, 19–21 Oct. 1992, Los Alamitos, California, pp. 164–169.

*Primary Examiner*—Thomas G. Black
*Assistant Examiner*—Paul R. Lintz
*Attorney, Agent, or Firm*—Staas & Halsey

[57] ABSTRACT

When a list to be sorted is divided into L sorted merge objective lists, each of the merge objective lists is formed of a plurality of blocks (where L is any natural number larger than or equal to 2). For each block, a block information record having a block identifier and a key value of a representative record of the block is generated. With the block information records, a first auxiliary information list is generated. The first auxiliary information list is sorted in a predetermined order of key values so as to generate a second auxiliary information list. The second auxiliary information list is almost equally divided into P portions (where P is any natural number larger than or equal to 2). For each of the P sub-auxiliary information lists, a forward boundary value and a backward boundary value are set corresponding to a predetermined rule. The P sub-auxiliary information lists are allocated to P process units. Each of the P process units retrieves a portion (segment) corresponding to the sub-auxiliary information list from the L sorted merge objective lists and merges blocks of the segment.

28 Claims, 23 Drawing Sheets

11-1~11-L : SORTED MERGE OBJECTIVE LIST

Fig. 9B

| 124 | |
|---|---|
| 7 | #0 |
| 13 | #1 |
| ⋮ | |
| 1005 | #41 |
| 1027 | #42 |
| 1073 | #43 |
| ⋮ | |
| 2048 | #99 |
| 12 | #100 |
| 25 | #101 |
| ⋮ | |
| 991 | #151 |
| 1037 | #152 |
| 1081 | #153 |
| ⋮ | |
| 2059 | #199 |
| 4 | #200 |
| 22 | #201 |
| ⋮ | |
| 1000 | #247 |
| 1012 | #248 |
| 1119 | #249 |
| ⋮ | |
| 2059 | #299 |
| 1 | #300 |
| 14 | #301 |
| ⋮ | |
| 1011 | #354 |
| 1023 | #355 |
| 1039 | #356 |
| ⋮ | |
| 2062 | #399 |

| #300 | #200 | #100 | #0 |
|---|---|---|---|
| 1 | 4 | 12 | 7 |
| 9 | 8 | 15 | 11 |
| 10 | 21 | 19 | 12 |
| #301 | #201 | #101 | #1 |
| 14 | 22 | 25 | 13 |
| 17 | 45 | 31 | 20 |
| 45 | 47 | 37 | 23 |
| ⋮ | ⋮ | ⋮ | ⋮ |
| #354 | #247 | #151 | #41 |
| 1011 | 1000 | 991 | 1005 |
| 1013 | 1001 | 1020 | 1018 |
| 1016 | 1010 | 1025 | 1022 |
| #355 | #248 | #152 | #42 |
| 1023 | 1012 | 1037 | 1027 |
| 1029 | 1115 | 1045 | 1035 |
| 1033 | 1117 | 1071 | 1060 |
| #356 | #249 | #153 | #43 |
| 1039 | 1119 | 1081 | 1073 |
| 1056 | 1123 | 1093 | 1120 |
| 1067 | 133 | 1095 | 1211 |
| ⋮ | ⋮ | ⋮ | ⋮ |
| #399 | #29 | #199 | #99 |
| 2062 | 2056 | 2059 | 2048 |
| 2068 | 2058 | 2066 | 2050 |
| 2070 | 2072 | 2069 | 2057 |
| 122-4 | 122-3 | 122-2 | 122-1 |

Fig. 10B

| | 124' | |
|---|---|---|
| 1241~ | 1 | #300 |
| | 4 | #200 |
| | 7 | #0 |
| | 12 | #100 |
| | 13 | #1 |
| | 14 | #301 |
| | 22 | #201 |
| | 25 | #101 |
| | ... | ... |
| | 991 | #151 |
| | 1000 | #247 |
| | 1005 | #41 |
| | 1011 | #354 |
| 1241~ | 1012 | #248 |
| 1241~ | 1023 | #355 |
| 1241~ | 1027 | #42 |
| 1243 → 1241~ | 1037 | #152 |
| 1241~ | 1039 | #356 |
| 1241~ | 1073 | #43 |
| | 1081 | #153 |
| 1241~ | 1119 | #249 |
| | ... | ... |
| | 2048 | #99 |
| | 2056 | #299 |
| | 2059 | #199 |
| 1241~ | 2062 | #399 |

| #300 | #200 | #100 | #0 |
|---|---|---|---|
| 1 | 4 | 1 | 7 |
| 9 | 8 | 15 | 11 — 1211 |
| 10 | 21 | 19 | 12 |
| #301 | #201 | #101 | #1 |
| 14 | 22 | 25 | 13 |
| 17 | 45 | 31 | 20 — 1211 |
| 45 | 47 | 37 | 23 |
| ... | ... | ... | ... |
| #354 | #247 | #151 | #41 |
| 1011 | 1000 | 991 | 1005 |
| 1013 | 1001 | 1020 | 1018 |
| 1016 | 1010 | 1025 | 1022 |
| #355 | #248 | #152 | #42 |
| 1023 | 1012 | 1037 | 1027 |
| 1029 | 1115 | 1045 | 1035 |
| 1033 | 1117 | 1071 | 1060 |
| #356 | #249 | #153 | #43 |
| 1039 | 1119 | 1081 | 1073 |
| 1056 | 1123 | 1093 | 1120 |
| 1067 | 1133 | 1095 | 1211 |
| ... | ... | ... | ... |
| #399 | #299 | #199 | #99 |
| 2062 | 2056 | 2059 | 2048 |
| 2068 — 1211 | 2058 | 2066 | 2050 — 1211 |
| 2070 | 2072 | 2069 | 2057 |
| 122-4 | 122-3 | 122-2 | 122-1 |

Fig. 11A

| 125-1 | |
|---|---|
| 1 | #300 |
| 4 | #200 |
| 7 | #0 |
| 12 | #100 |
| 13 | #1 |
| 14 | #301 |
| 22 | #201 |
| 25 | #101 |
| ... | |
| 991 | #151 |
| 1000 | #247 |
| 1005 | #41 |
| 1011 | #354 |
| 1012 | #248 |
| 1023 | #355 |
| 1027 | #42 |

Fig. 11B

| 125-2 | |
|---|---|
| 1012 | #248 |
| 1023 | #355 |
| 1027 | #42 |
| 1037 | #152 |
| 1039 | #356 |
| 1073 | #43 |
| 1081 | #153 |
| 1119 | #249 |
| ... | |
| 2048 | #99 |
| 2056 | #299 |
| 2059 | #199 |
| 2062 | #399 |

| | | | | |
|---|---|---|---|---|
| 1241~ | 16 | #0 | 3 | #109 |
| | 20 | #1 | 15 | #110 |
| | 38 | #2 | 31 | #111 |
| | 61 | #3 | 46 | #112 |
| | 91 | #4 | 64 | #113 |
| | 113 | #5 | 82 | #114 |
| | 129 | #6 | 114 | #115 |
| | 137 | #7 | 123 | #116 |
| | 153 | #8 | 148 | #117 |
| | 0 | #9 | 2 | #200 |
| | 7 | #10 | 24 | #201 |
| | 26 | #11 | 41 | #202 |
| | 47 | #12 | 44 | #203 |
| | 56 | #13 | 66 | #204 |
| | 76 | #14 | 83 | #205 |
| | 97 | #15 | 103 | #206 |
| | 118 | #16 | 109 | #207 |
| | 136 | #17 | 141 | #208 |
| | 1 | #100 | 9 | #209 |
| | 40 | #101 | 14 | #210 |
| | 70 | #102 | 36 | #211 |
| | 77 | #103 | 57 | #212 |
| | 95 | #104 | 69 | #213 |
| | 111 | #105 | 85 | #214 |
| | 126 | #106 | 104 | #215 |
| | 150 | #107 | 121 | #216 |
| | 157 | #108 | 143 | #217 |

| | | |
|---|---|---|
| 1241— | 0 | #9 |
| | 1 | #100 |
| | 2 | #200 |
| | 3 | #109 |
| | 7 | #10 |
| | 9 | #209 |
| | 14 | #210 |
| | 15 | #110 |
| | 16 | #0 |
| | 20 | #1 |
| | 24 | #201 |
| | 26 | #11 |
| | 31 | #111 |
| | 36 | #211 |
| | 38 | #2 |
| | 40 | #101 |
| | 41 | #202 |
| | 44 | #203 |
| | 46 | #112 |
| 1241— 1246→ | 47 | #12 |
| 1241— | 56 | #13 |
| | 57 | #212 |
| | 61 | #3 |
| | 64 | #113 |
| | 66 | #204 |
| | 69 | #213 |
| | 70 | #102 |

124'

| | | |
|---|---|---|
| | 76 | #14 |
| | 77 | #103 |
| | 82 | #114 |
| | 83 | #205 |
| | 85 | #214 |
| | 91 | #4 |
| | 95 | #104 |
| | 97 | #15 |
| | 103 | #206 |
| | 104 | #215 |
| 1241— 1247→ | 109 | #207 |
| 1241— | 111 | #105 |
| | 113 | #5 |
| | 114 | #115 |
| | 118 | #16 |
| | 121 | #216 |
| | 123 | #116 |
| | 126 | #106 |
| | 129 | #6 |
| | 136 | #17 |
| | 137 | #7 |
| | 141 | #208 |
| | 143 | #217 |
| | 148 | #117 |
| | 150 | #107 |
| | 153 | #8 |
| 1241— | 157 | #108 |

125-1
FORWARD BOUNDARY VALUE "0"

| | |
|---|---|
| 0 | #9 |
| 1 | #100 |
| 2 | #200 |
| 3 | #109 |
| 7 | #10 |
| 9 | #209 |
| 14 | #210 |
| 15 | #110 |
| 16 | #0 |
| 20 | #1 |
| 24 | #201 |
| 26 | #11 |
| 31 | #111 |
| 36 | #211 |
| 38 | #2 |
| 40 | #101 |
| 41 | #202 |
| 44 | #203 |
| 46 | #112 |
| 47 | #12 |

BACKWARD BOUNDARY VALUE "56"

Fig. 19A

125-2
FORWARD BOUNDARY VALUE "56"

| | |
|---|---|
| 36 | #211 |
| 38 | #2 |
| 40 | #101 |
| 44 | #203 |
| 46 | #112 |
| 56 | #13 |
| 57 | #212 |
| 61 | #3 |
| 64 | #113 |
| 66 | #204 |
| 69 | #213 |
| 70 | #102 |
| 76 | #14 |
| 77 | #103 |
| 82 | #114 |
| 83 | #205 |
| 85 | #214 |
| 91 | #4 |
| 95 | #104 |
| 97 | #15 |
| 103 | #206 |
| 104 | #215 |
| 109 | #207 |

BACKWARD BOUNDARY VALUE "111"

Fig. 19B

125-3
FORWARD BOUNDARY VALUE "111"

| | |
|---|---|
| 82 | #114 |
| 91 | #4 |
| 97 | #15 |
| 104 | #215 |
| 109 | #207 |
| 111 | #105 |
| 113 | #5 |
| 114 | #115 |
| 118 | #16 |
| 121 | #216 |
| 123 | #116 |
| 126 | #106 |
| 129 | #6 |
| 136 | #17 |
| 137 | #7 |
| 141 | #208 |
| 143 | #217 |
| 148 | #117 |
| 150 | #107 |
| 153 | #8 |
| 157 | #108 |

BACKWARD BOUNDARY VALUE "∞"

| 124' | |
|---|---|
| 10 | #300 |
| 12 | #0 |
| 19 | #100 |
| 21 | #200 |
| 23 | #1 |
| 37 | #101 |
| 45 | #301 |
| 47 | #201 |
| ... | |
| 1010 | #247 |
| 1016 | #354 |
| 1022 | #41 |
| 1025 | #151 |
| 1033 | #355 |
| 1060 | #142 |
| 1067 | #356 |
| 1071 | #152 |
| 1095 | #153 |
| 1117 | #248 |
| 1121 | #243 |
| 1133 | #249 |
| ... | |
| 2057 | #99 |
| 2069 | #199 |
| 2070 | #399 |
| 2072 | #299 |

| 122-4 | | 122-3 | | 122-2 | | 122-1 | |
|---|---|---|---|---|---|---|---|
| 1 | #300 | 4 | #200 | 12 | #100 | 7 | #0 |
| 9 | | 8 | | 15 | | 11 | |
| 10 | #301 | 21 | #201 | 19 | #101 | 12 | #1 |
| 14 | | 22 | | 25 | | 13 | |
| 17 | | 45 | | 31 | | 20 | |
| 45 | | 47 | | 37 | | 23 | |
| ... | #354 | ... | #247 | ... | #151 | ... | #41 |
| 1011 | | 1000 | | 991 | | 1005 | |
| 1013 | | 1001 | | 1020 | | 1018 | |
| 1016 | #355 | 1010 | #248 | 1025 | #152 | 1022 | #42 |
| 1023 | | 1012 | | 1037 | | 1027 | |
| 1029 | | 1115 | | 1045 | | 1035 | |
| 1033 | #356 | 1117 | #249 | 1071 | #153 | 1060 | #43 |
| 1039 | | 1119 | | 1081 | | 1073 | |
| 1056 | | 1123 | | 1093 | | 1120 | |
| 1067 | | 1133 | | 1095 | | 1211 | |
| ... | #399 | ... | #299 | ... | #199 | ... | #99 |
| 2062 | | 2056 | | 2059 | | 2048 | |
| 2068 | | 2058 | | 2066 | | 2050 | |
| 2070 | | 2072 | | 2069 | | 2057 | |

Fig. 22A

FORWARD BOUNDARY VALUE "0"

| 125-1 | |
|---|---|
| 10 | #300 |
| 12 | #0 |
| 19 | #100 |
| 21 | #200 |
| 23 | #1 |
| 37 | #101 |
| 45 | #301 |
| 47 | #201 |
| ⋮ | |
| 1010 | #247 |
| 1016 | #354 |
| 1022 | #41 |
| 1025 | #151 |
| 1033 | #355 |
| 1060 | #42 |
| 1067 | #356 |
| 1071 | #152 |
| 1117 | #248 |
| 1121 | #43 |

BACKWARD BOUNDARY VALUE "1067"

| 125-2 | |
|---|---|
| 1071 | #152 |
| 1095 | #153 |
| 1117 | #248 |
| 1121 | #43 |
| 1133 | #249 |
| ⋮ | |
| 2057 | #99 |
| 2069 | #199 |
| 2070 | #399 |
| 2072 | #299 |

FORWARD BOUNDARY VALUE "2072"

PARALLEL MERGE AND SORT PROCESS METHOD AND SYSTEM THEREOF

BACKGROUND OF THE INVENTION

1. Field of the Invention

The present invention relates to a merge and sort process method for merging a plurality of sorted data sequences so as to generate one sorted data sequence. In particular, the present invention relates to a parallel merge and sort process method using a plurality of processors and a system thereof.

2. Description of the Related Art

The parallel merge and sort process needed for application in databases. The basic operations for the databases are for example sorting and retrieving records. If a parallel merge and sort process is executed by a parallel processing computer, the records can be sorted and merged at high speed.

The sorting is a process for reordering a set of records into a new sequence corresponding to a relation of particular keys of the records. These keys are referred to as sort keys. There are two ways for reordering the records during sorting: ascending order and descending order of the values of the sort keys.

In addition, the sorting can be categorized as internal sort and external sort. The internal sort is performed when data to be sorted is stored in a main memory, whereas the external sort is performed when data to be sorted is in an external memory. Access time of the computer to the main memory is shorter than that to the external memory. Thus, the speed of the internal sort is higher than the speed of the external sort. However, since the storage capacity of the main memory is limited, when a large number of records are sorted, they should be externally sorted in such a manner that they are stored in the external memory and sorted therein.

To properly sort such a large amount of data of records, a merge and sort process method is known. In this method, a data sequence to be sorted (this data sequence is referred to as a sort objective list) is divided into a plurality of segments. Records in each segment are sorted corresponding to sort keys. Sorted segments (sorted lists) are merged so as to generate one sorted list. In this list, records are sorted in ascending order or descending order corresponding to the values of the sort keys.

To increase the speed of the merge and sort process method, a parallel merge and sort process method using a plurality of processors has been proposed. To further increase the speed of the merge and sort process method, a technology for properly allocating a plurality of sorted lists to the processors at high speed is required.

To perform the merge and sort process at high speed with a plurality of processors, a plurality of sorted lists are divided into segments and allocated to processors. Thereafter, the processors perform the merge and sort process for their allocated segments.

For example, a method for sampling a proper record of a plurality of sorted lists and dividing the lists corresponding the sampled result has been proposed as Japanese Patent Laid-Open Publication No. 2-227725, titled "Segmenting Sorted Lists (translated title)".

FIG. 1 is a schematic diagram showing an example of a parallel merge and sort process using a conventional multi-processor system. In this example, three process units 10-1 to 10-3 perform the merge process for sorted merge objective lists 11-1 to 11-3.

In this method, sort keys that are selected at random from the merge objective lists 11-1 to 11-3 are used as dividing points 12 and 13 so as to allocate the merge objective lists 11-1 to 11-3 to the process units 10-1 to 10-3. It is determined whether or not each segment divided by the dividing points 12 and 13 has nearly the same number of elements. When the determined result is "NO", other sort keys are used as the dividing points according to a predetermined procedure. Thereafter, the segments to be divided are determined.

By adjusting the dividing points 12 and 13, segments Seg1 to Seg3 are selected so that the number of elements thereof becomes the nearly same. Seg1 is allocated to the process unit 10-1. Seg2 is allocated to the process unit 10-2. Seg3 is allocated to the process unit 10-3. Thus, the Seg1 to Seg3 are processed in parallel by the process units 10-1 to 10-3, respectively.

Other merge and sort process methods that are not parallel merge and sort process methods are disclosed as Japanese Patent Laid-Open Publication No. 57-90757 "Sort and Merge Process Method" and No. 2-75018 "Merge Process Method". The former is a merge and sort process method for effectively performing a merge and sort process with a single processor. The latter is a modification of the former method. In these methods, sort keys of records representing blocks of the sort objective list including records to be sorted are obtained. With the sort keys obtained, the records are sorted and merged.

In the merge process method using a single processor disclosed as Japanese Patent Laid-Open Publication No. 2-75018, with the system construction shown in FIG. 4, the records are merged and sorted corresponding to a flow chart shown in FIG. 2. Arrows in FIG. 2 represent flows of information. Next, the merge and sort process shown in FIG. 2 will be described step by step.

1. A record group with a predetermined number of records is read from a sort objective list 31 in a memory unit 30 to an internal sort buffer 21 (at step S1 of FIG. 3). An internal sort process unit 22 sorts the record group corresponding to sort keys and stores the sorted record group in the buffer 21 (at step S2 of FIG. 3).

2. The sorted record group that is one sorted and merged objective list stored in the internal sort buffer 21 is written to an intermediate file 32 of the memory unit 30. At this point, the first record of a plurality of records of each block is selected as a representative record. The value of a sort key of the representative record and an identifier of the block are paired as one record. This record is added to an auxiliary information list 23 (at step S3 of FIG. 3). In the initial state, the auxiliary information list 23 is empty.

3. The steps 1 and 2 are continued until the entire sort objective list 31 is completely processed (at step S4 of FIG. 3). Thus, L sorted merge objective lists 11-1 to 11-L are generated in the intermediate file 32.

4. An internal sort process unit 22 sorts record groups in the auxiliary information list 23 corresponding to sort keys of the records (at step S5 of FIG. 3).

5. Records in the sorted auxiliary information list 23 are read in succession from the beginning and blocks corresponding to block identifiers are read from the intermediate file 32 to merge input files 24-1 to 24-L, each of which has the storage capacity for one block (at steps S6 to S8 of FIG. 3).

6. A merge process portion 25 performs an L-way merge process for L blocks stored in the merge input buffers 24-1 to 24-L and inserts records into a merge output buffer 26 in the descending order of sort key values of the records (at step S9 of FIG. 3). When one of the merge input buffers 24-1 to 24-L is used, the next record is retrieved from the auxiliary information list 23 and a block corresponding to the block identifier of the record is written from the intermediate file 32 to the used merge input buffer 24-i (where $1 \leq i \leq L$) (at steps S46 to S48 of FIG. 13). When the merge output buffer 26 becomes full, the content therein is added to a sorted list 33 and the merge output buffer 26 is emptied (at steps S10 and S11 of FIG. 3). In the initial state, the sorted list 33 is empty.

For the L-way merge process, refer to "The Art of Computer Programming, Vol. 3. Sorting and Searching", by D. E. Knuth, Addison-Wesley Publishing Company Inc., 1973, pp. 252–253.

7. The step 6 is continued until all records in the auxiliary information list 23 are completely processed.

8. The merge process portion 25 performs the merge process until all the merge input buffers 24-1 to 24-L are used (at step S12 of FIG. 3) and inserts the results in the merge output buffer 26. At this point, when the merge output buffers 26 become full, the contents thereof are added to the sorted list 33, and the merge output buffer 26 is emptied.

9. When there is a record left in the merge output buffer 26, the content thereof is added to the sorted list 33 (at step 13 of FIG. 3) and the process is completed.

In the above-described merge and sort process, when a list group 11-i (where $1 \leq i \leq L$) to be merged is generated, records with block identifiers and values of sort keys of first records for blocks of sorted merge objective list groups 11-1 to 11-L are generated and registered in the auxiliary information list 23.

According to the conventional system, blocks to be merged can be effectively selected. However, the merge process is not performed in parallel by a plurality of processors. Thus, to increase the speed of the merge process in the conventional system, along with the technology shown in FIG. 1, an advanced technology for properly segmenting the sorted merge objective list and for allocating it to a plurality of processors is required.

In the conventional parallel merge and sort process method shown in FIG. 1, to obtain one dividing point, the process for sequentially reading records from each of a plurality of sorted merge objective lists 11-1 to 11-3 should be repeated a plurality of times. However, the sorted lists are stored in a slow memory unit such as a secondary memory unit, if a large number of records are processed, as in a database system, it takes a long time. This drawback prevents the sort speed of records from increasing.

SUMMARY OF THE INVENTION

The present invention is based on the above-described point of view. An object of the present invention is to provide a parallel merge and sort process method for segmenting a plurality of sorted lists generated from a sort objective list and for allocating the sorted lists to a plurality of processors without need to read records from the sorted lists so as to accomplish high speed parallel merge and sort process.

The present invention is a merge and sort process method for dividing a data sequence to be sorted into a plurality of sorted data sequences and merging the sorted data sequences, comprising the steps of dividing the data sequence to be sorted into L sorted data sequences, each of which is formed of a plurality of blocks (where L is any natural number larger than or equal to 2), generating a block information record for each block of the sorted data sequences, the block information record having identification information of the block and representative data thereof and arranging the block information records so as to generate a first auxiliary information record group, arranging the block information records of the first auxiliary information record group in a predetermined order corresponding to values of the representative data so as to generate a second auxiliary record group, dividing the second auxiliary record group into P sub-auxiliary information record groups, each of which has nearly the same number of the block information records (where P is any natural number larger than or equal to 2), and allocating the P sub-auxiliary information record groups to a plurality of process units adapted for merging blocks corresponding to the block information records of the sub-auxiliary information record groups of the L sorted data sequences allocated to the process units in parallel and for merging the P sorted data sequences so as to sort the data sequence to be merged in a predetermined order.

As described above, a data sequence to be sorted is divided into L sorted data sequences, each of which is formed of a plurality of blocks. These data sequences are divided into P segments Seg1 to SegP by P sub-auxiliary record groups. The segments Seg1 to SegP are block groups that are arranged in the above-mentioned L sorted data sequences. A plurality of process units merge P allocated segments Seg1 to SegP corresponding to block information records in the sub-auxiliary record groups in parallel. Based on the results of the merge process, a sorted data sequence is generated in a predetermined order.

When the data amount of the data sequence to be sorted is huge, L sorted data sequences are temporarily stored in the secondary memory unit. According to the present invention, L sorted data sequences are divided into P segments Seg1 to SegP in the main memories of corresponding process units. In other words, the first auxiliary record group, the second auxiliary record group, . . . and P-th sub-auxiliary record group are generated on the main memories of the process units.

Thus, L sorted data sequences stored in the secondary memory unit can be segmented without need to access them.

Consequently, the process for segmenting L sorted data sequences into P segments Seg1 to SegP can be performed at high speed. As a result, a large number of data sequences can be sorted in parallel at high speed.

These and other objects, features and advantages of the present invention will become more apparent in light of the following detailed description of best mode embodiments thereof, as illustrated in the accompanying drawings.

BRIEF DESCRIPTION OF DRAWINGS

One skilled in the art can easily understand additional features and objects of this invention from the description of the preferred embodiments and some of the attached drawings. In the drawings:

FIG. 9A is a schematic diagram showing the contents of four merge objective lists 122-1 to 122-4 sorted by an internal sort process portion 120 shown in FIG. 5;

FIG. 9B is a schematic diagram showing the content of a first auxiliary information list 124 having index information of each block 1211 of the merge objective lists 122-1 to 122-4;

FIG. 10A is a schematic diagram showing the contents of the sorted merge objective lists 122-1 to 122-4;

FIG. 10B is a schematic diagram showing the content of a second auxiliary information list 124' obtained by sorting the first auxiliary information list 124 in the ascending order of sort keys of divided information record 1241;

FIGS. 11A and 11B are schematic diagrams showing the contents of first and second sub-auxiliary information lists 125-1 and 125-2 where the second sub-auxiliary information list 124' is divided by an auxiliary information list dividing process portion 140 shown in FIG. 5;

FIG. 11C is a schematic diagram showing the contents of the sorted merge objective lists 122-1 to 122-4;

FIG. 17 is a schematic diagram showing the content of a first auxiliary information list 124 having index information of each block 1211 of the sorted merge objective lists 122-1 to 122-6;

FIG. 18 is a schematic diagram showing the content of the second auxiliary information list 124' obtained by dividing the first auxiliary information list 124 corresponding to sort keys of divided information records 1241;

FIGS. 19A, 19B, and 19C are schematic diagrams showing the contents of three sub-auxiliary information lists 125-1 to 125-3 obtained by dividing the second auxiliary information list 124 shown in FIG. 18, respectively;

FIGS. 20A, 20B, and 20C are schematic diagrams showing the contents of sorted lists 388-1 to 388-3 obtained by merging the sub-auxiliary information lists 125-1 to 125-3 shown in FIGS. 19A to 19C, respectively;

FIG. 21A is a schematic diagram showing the contents of the sorted merge objective lists 122-1 to 122-4 used in a second parallel merge and sort process method according to an embodiment of the present invention;

FIG. 21B is a schematic diagram showing the content of the first auxiliary information list 124 having index information of each block 1211 of the merge objective lists 122-1 to 122-4;

FIG. 22A is a schematic diagram showing the contents of the sorted merge objective lists 122-1 to 122-4;

FIG. 22B is a schematic diagram showing the content of the second auxiliary information list 124' obtained by sorting the first auxiliary information list 124 shown in FIG. 22A corresponding to sort keys of the divided information records 1241;

DESCRIPTION OF THE PREFERRED EMBODIMENTS

Next, with reference to the accompanying drawings, embodiments of the present invention will be described.

Although the present invention is applicable to sorting of data sequences with any data construction, in the following embodiments, data sequences with list construction will be described. In addition, the present invention is applicable to data sequences with other data constructions such as a matrix or a record group of a sequential file.

Figure 1:
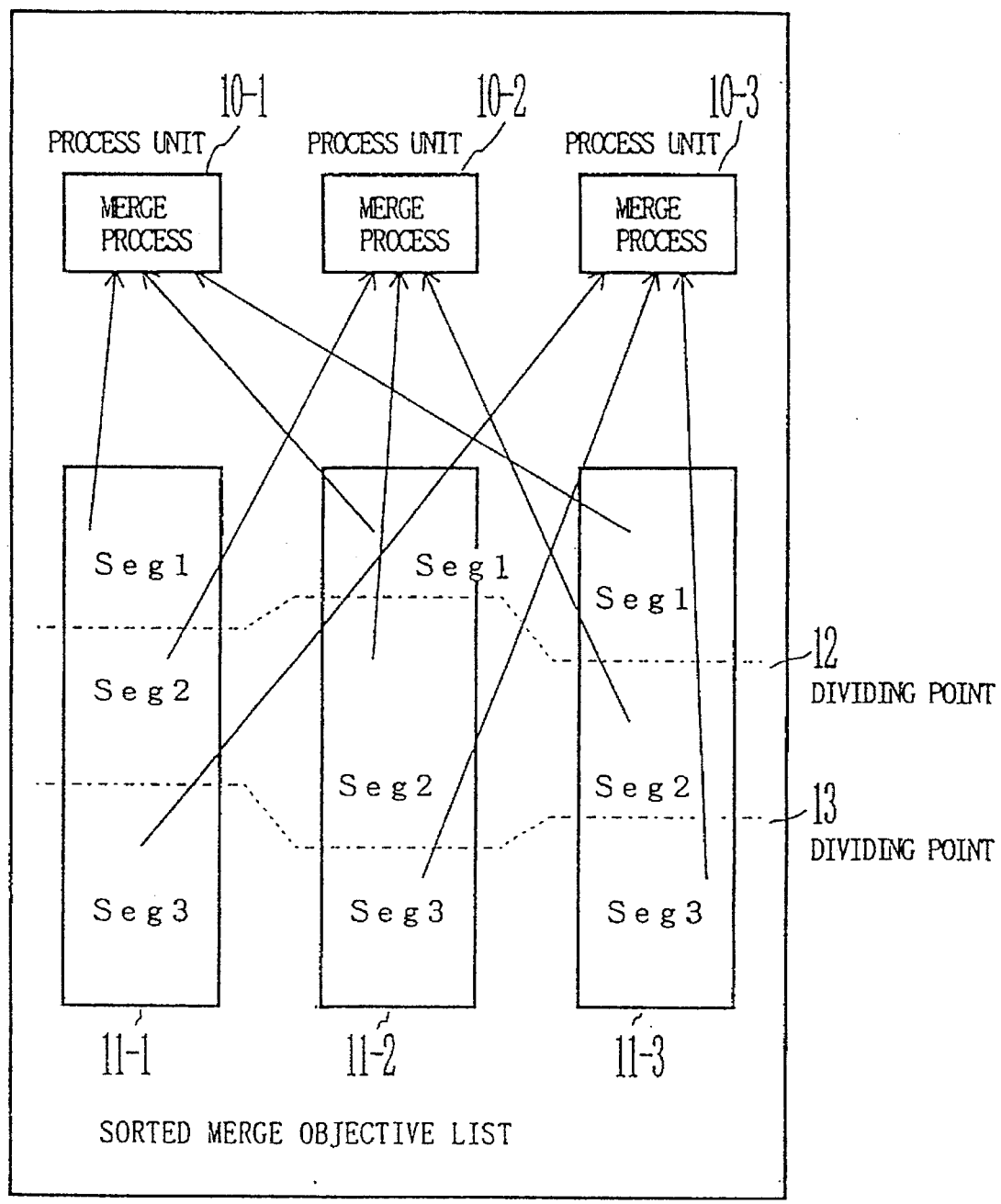
FIG. 1 is a schematic diagram for explaining a conventional parallel merge and sort process method.
Figure 2:
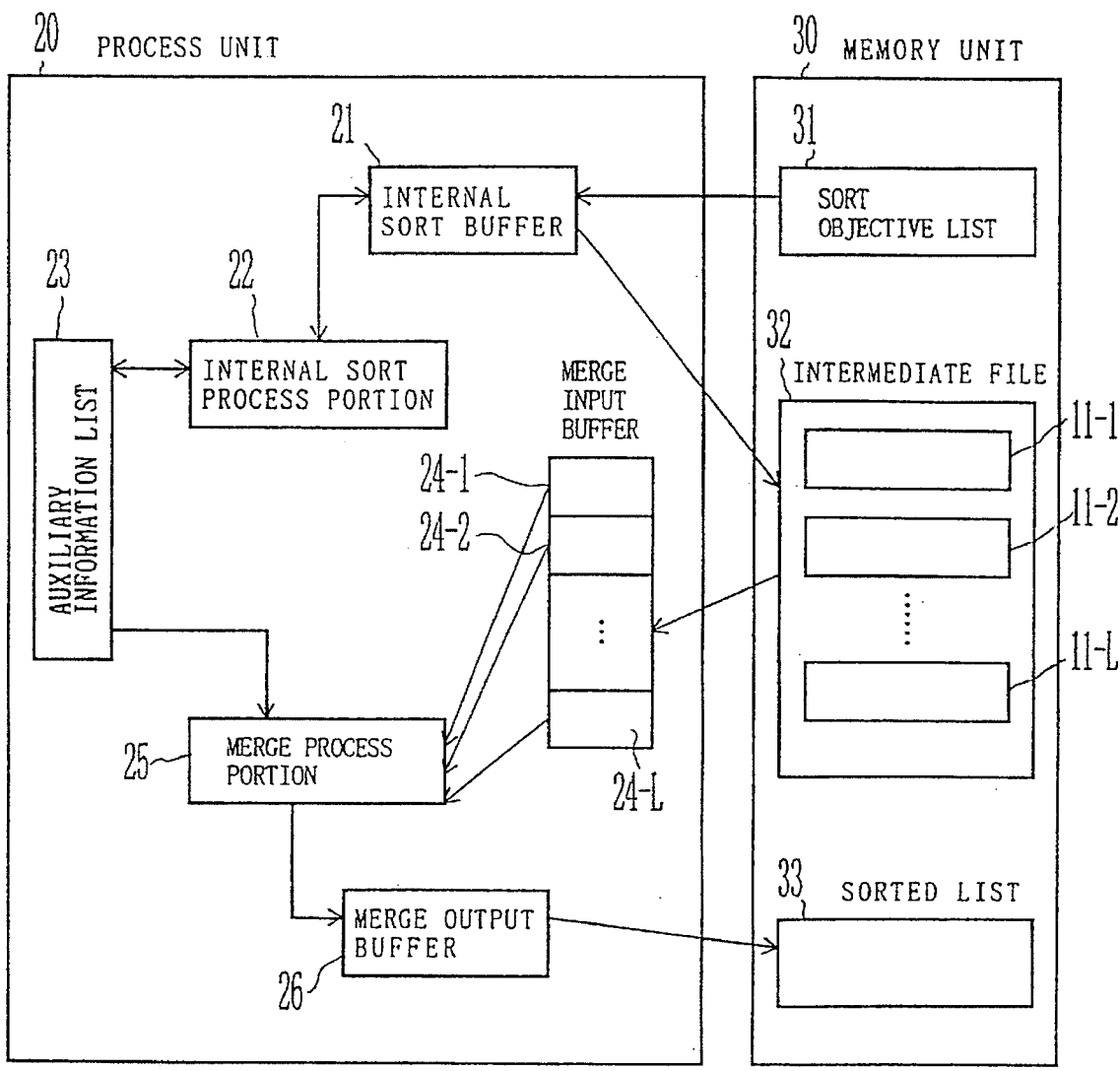
FIG. 2 is a schematic diagram for explaining a merge and sort process method for segmenting a sort objective list according to a conventional single processor system.
Figure 3:
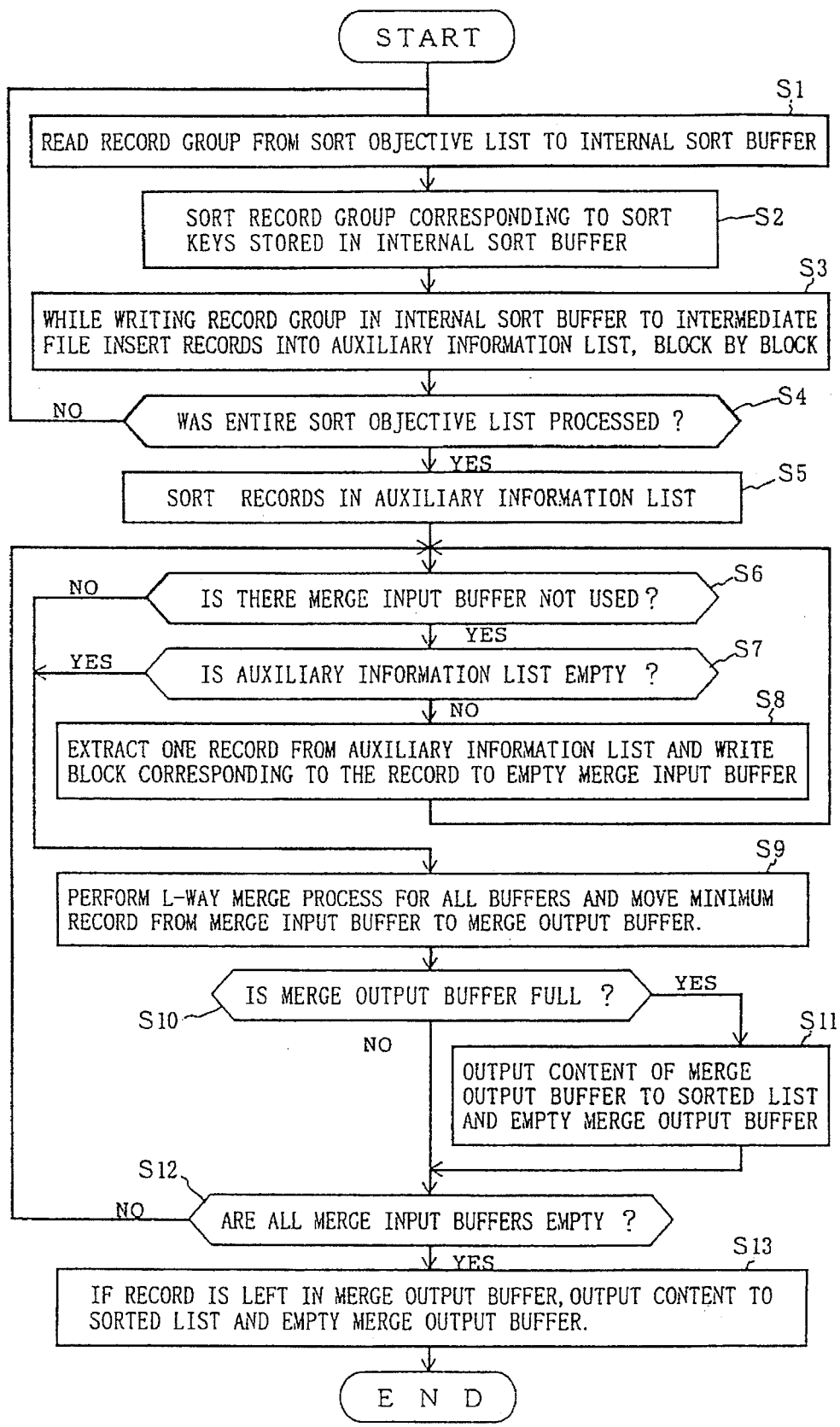
FIG. 3 is a flow chart for explaining a practical process of the merge and sort method shown in FIG. 2.
Figure 4:
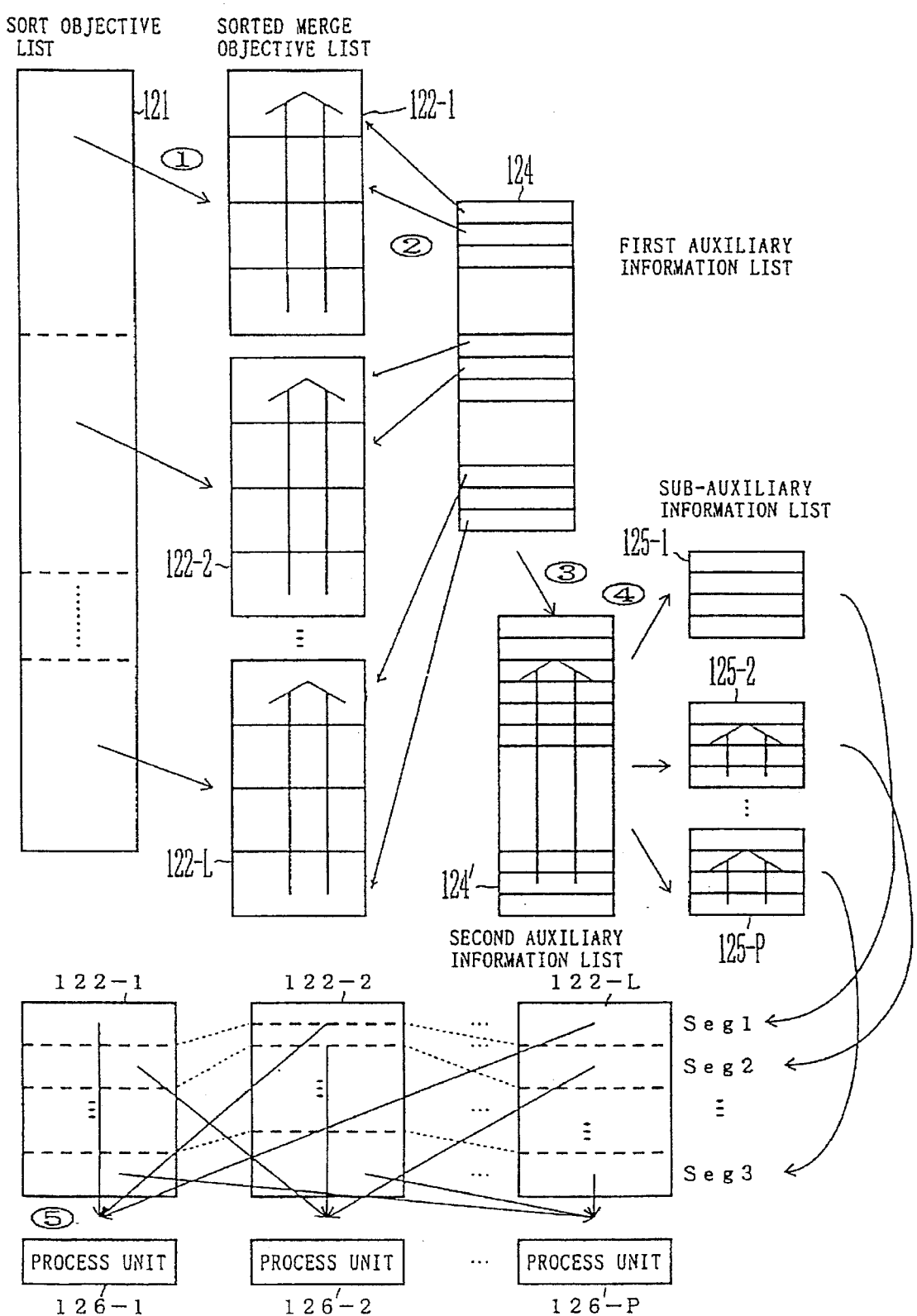
FIG. 4 is a schematic diagram for explaining the theory of a parallel merge and sort process method according to an embodiment of the present invention.

FIG. 4 is a schematic diagram for explaining the theory of a parallel merge and sort process method according to an embodiment of the present invention. In this method, a plurality of sorted lists 122-1 to 122-L are generated with a sort objective list 121 formed of a plurality of records corresponding to sort keys of records. These sorted lists are hereinafter referred to as sorted merge objective lists. By merging the sorted merge objective lists, one sorted list is generated. To increase the speed of the sort and merge process, the following process is performed.

First, L sorted merge objective lists 122-1 to 122-L (where $L \geq 2$) are generated from the sort objective list 121 (step 1 of FIG. 4). The sorted merge objective lists 122-1 to 122-L are divided into blocks, each of which has a plurality of records. For each block, a record with identification information of the block and the value of a sort key of a record representing the block is generated. This record is referred to as a block information record. By collecting these block information records, a first auxiliary information list (first auxiliary information record group) 124 is generated (step 2 of FIG. 4).

Next, all the block information records in the first auxiliary information list 124 are sorted corresponding to the values of the sort keys and thereby a second auxiliary information list (second auxiliary information record group) 124' is generated (step 3 of FIG. 4).

The second auxiliary information list 124' is divided into P sub-auxiliary information list (sub-auxiliary information record groups) 125-1 to 125-P (where $P \geq 2$) (step 4 of FIG. 4).

P process units 126-j (where $1 \leq j \leq P$) read data portions allocated thereto from the L sorted merge objective lists 122-1 to 122-L corresponding to block information records in the sub-auxiliary information list 125-j (where 1≦j≦P) in parallel. These data portions are referred to as (segment Segj (where 1≦j ≦P)). The P process units 126-1 to 126-P merge records in the allocated segments Seg1 to SegP in parallel, thereby generating a list where all the records of the sort objective list 121 are sorted in the ascending order or descending order of the values of the sort keys (step 5 of FIG. 4).

Next, a practical example of the above-mentioned steps 1 to 5 will be described.

The L sorted merge objective lists 122-1 to 122-L are stored in a secondary memory unit in such a manner that blocks with a fixed length are successively arranged. Each block information record of the first auxiliary information list 124 corresponds to one of the L sorted merge objective lists 122-1 to 122-L. In addition, each block information record has a block identifier that is index information for identifying a corresponding block in the secondary memory unit and the value of a sort key of for example the first record.

The second auxiliary information list 124' is divided into the P sub-auxiliary information lists 125-1 to 125-P, each of which has nearly the same number of the block information records. In the parallel merge process, the P process units 126-1 to 126-P merge P segments Seg1 to SegP allocated thereto where the L sorted merge objective lists 122-1 to 122-L are divided corresponding to the P sub-auxiliary information lists 125-1 to 125-P.

When the second auxiliary information list 124' is divided into P sub-auxiliary information lists 125-j (where 1≦j≦P), a forward boundary value and a backward boundary value are set to each of the sub-auxiliary information lists 125-j. In the first parallel merge and sort process method, the forward boundary value of each of the sub-auxiliary information lists 125-j is the value of the sort key of the first record thereof.

The backward boundary value is the value of the sort key of the first record of the sub-auxiliary information list 125-k (where k=j+1) that is preceded by the sub-auxiliary information list 125-j. In the case of the last sub-auxiliary information list 125-P, the backward boundary value is a large value of a sort key of a record in the lists 122-1 to 122-L (this value is for example infinity).

After the forward boundary value and the backward boundary value are set to the sub-auxiliary information lists 125-1 to 125-P, the segments Seg1 to SegP are set correspondingly to these boundary values in the following manner.

In the following description, for simplicity, all the sub-auxiliary information lists 125-1 to 125-P are expressed as a sub-auxiliary information list 125.

When a particular (later) sub-auxiliary information list 125 is preceded by another (former) sub-auxiliary information list 125, a block information record of a block that may have records with sort key values that are larger than the forward boundary value of the later sub-auxiliary information list 125 are retrieved from the former sub-auxiliary information list 125. The block information record is added to the beginning of the later sub-auxiliary information list.

The sorted merge objective lists 122-1 to 122-P are divided into P segments Seg1 to SegP corresponding to information of all the block information records contained in the sub-auxiliary information list 125 and the forward boundary value and the backward boundary value of the sub-auxiliary information list 125. In other words, a record group where sort key values of all records in all blocks of the sub-auxiliary information list 125-j (1≦j≦P) are larger than or equal to the forward boundary value thereof and are smaller than the backward boundary value thereof is referred to as segment Segj. Thus, as shown in FIG. 4, L sorted merge objective lists 122-1 to 122-L are divided into P segments Seg1 to SegP corresponding to P sub-auxiliary information lists 125-1 to 125-P. The records of the segments Seg1 to SegP are present in the merge objective lists 122-1 to 122-L.

The sub-auxiliary information lists 125-1 to 125-P are allocated to the P process units 126-1 to 126-P, respectively. Each of the process units 126-j (where 1≦j≦P) reads records of the segment Segj allocated thereto corresponding to the sub-auxiliary information list 125-j (where 1≦j≦P) and performs the merge process for these records. The merge process is performed in parallel by the P process units 126-1 to 126-P. Thus, all the records of the sort objective list 121 are sorted corresponding the sort key values.

Figure 5:
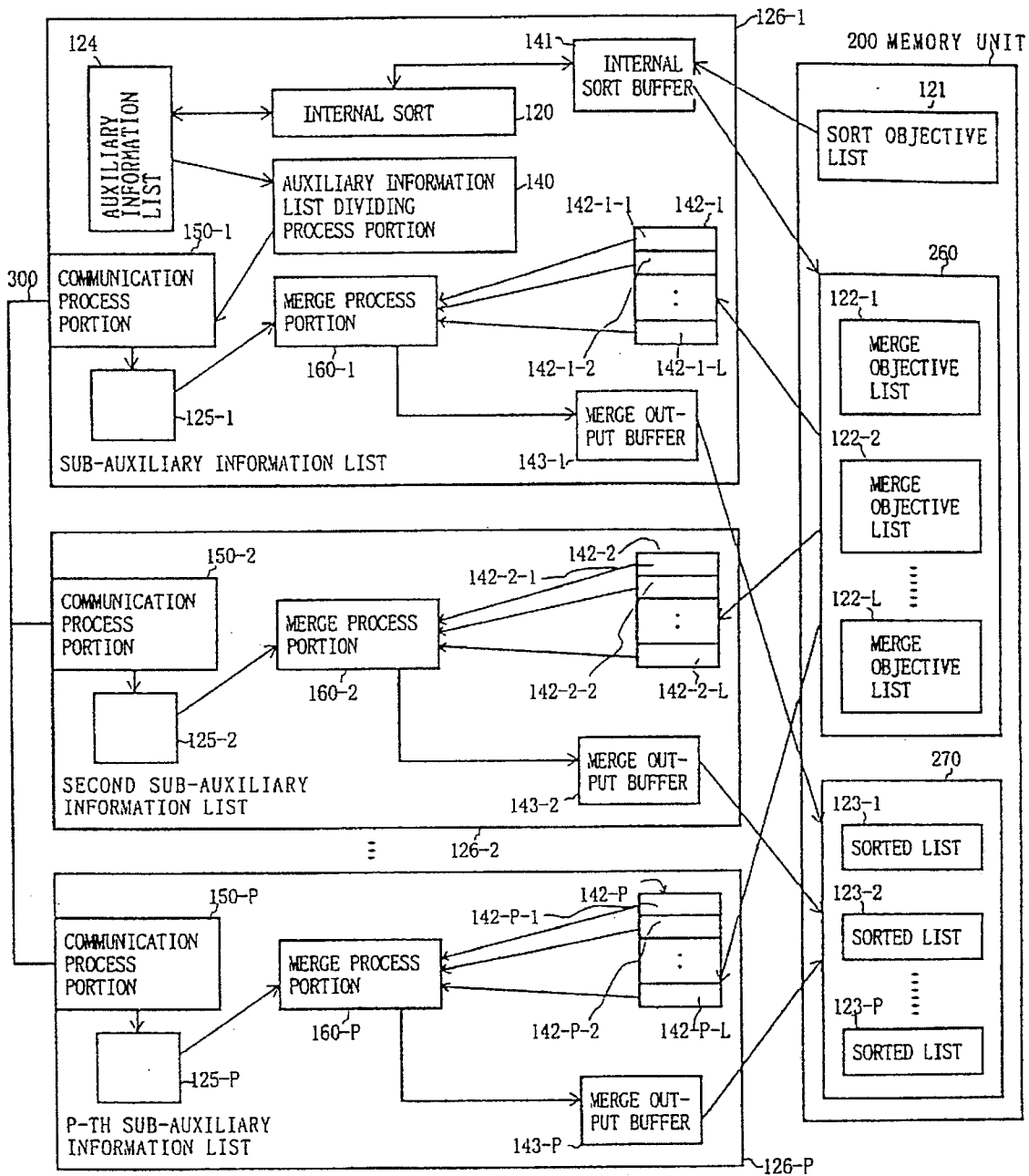
FIG. 5 is a block diagram showing the construction of an apparatus for executing the parallel merge and sort process corresponding to the parallel merge and sort process method shown in FIG. 4.

FIG. 5 is a block diagram showing the system construction of a parallel merge and sort process apparatus that sorts the sort objective list 121 corresponding to the above-mentioned first parallel merge and sort process method.

In FIG. 5, reference numerals 126-1 to 126-P are process units. Reference numeral 200 is a secondary memory unit. Reference numeral 300 is a communication path. Reference numeral 120 is an internal sort process portion. Reference numeral 140 is an auxiliary information list dividing process portion. Reference numerals 150-1 to 150-P are communication process portions. Reference numerals 160-1 to 160-P are merge process portions. Reference numeral 121 is a sort objective list. Reference numerals 122-1 to 122-L are sorted merge objective lists. Reference numerals 123-1 to 123-P are sorted lists generated by the process units. Reference numeral 124' is an auxiliary information list. Reference numerals 125-1 to 125-P are sub-auxiliary information lists. Reference numeral 260 is an intermediate file. Reference numeral 270 is a sorted list. Reference numeral 141 is an internal sort buffer. Reference numerals 142-1 to 142-P are merge input buffers. Reference numerals 143-1 to 143-P are merge output buffers. Arrows in FIG. 5 represent flows of information.

The process unit 126-1 has the internal sort buffer 141, the internal sort process portion 120, the list dividing process portion 140, the merge input buffer 142-1, the merge process portion 160-1, the merge output buffer 143-1, and the communication process portion 150-1. In addition, the process unit 126-1 has a main memory with a working area for generating the first auxiliary information list 124, the second auxiliary information list 124', and the sub-auxiliary information list 125-1.

Each of the other process units 126-L (where 2≦L≦P) has the merge input buffer 142-L, the merge process portion 160-L, the merge output buffer 143-L, and the communication process portion 150-P. In addition, each of the other process units 126-L has a main memory with a working area for generating the sub-auxiliary information list 125-L. The P process units 126-1 to 126-P are connected to each other through the communication path 300.

The secondary memory unit 200 is for example a magnetic disk, a magneto-optical disk, a magnetic tape, or the like. The secondary memory unit 200 stores the sort objective list 121, the intermediate file 260, and the sorted list 270.

Next, each block of the process unit 126-1 will be described.

The internal sort buffer 141 temporarily stores a fixed number of records read from the sort objective list of the memory unit 200. These records are referred to as a record group. The record group is read by for example the internal sort process portion 120. The internal sort process portion 120 sorts the record group written to the internal sort buffer 141 corresponding to the values of the sort keys in the ascending order or descending order. The sorted record group is written to the internal sort buffer 120. In addition, the sorted record group is written to the intermediate file 260 in the memory unit 200 and stored as the merge objective lists 122-1 to 122-L. The merge objective lists 122-1 to 122-L are segmented as blocks with a fixed size. The above-mentioned block information record is generated for each block and successively added to the first auxiliary information list 124. When the above process is completed for all the records of the sort objective list 121, the block information record group in the first auxiliary information list 124 is sorted in the ascending order or the descending order corresponding to the values of the sort keys.

The auxiliary information list dividing process portion 140 divides the block information record group in the second auxiliary information list 124' sorted by the internal sort process portion 120 into P sub-auxiliary information lists 125-1 to 125-P. The process unit 126-1 requests the communication process portion 150-1 to transmit the sub-auxiliary information lists 125-2 to 125-P other than the sub-auxiliary information list 125-1 allocated to the process unit 126-1 to the other process units 126-2 to 126-P.

Thus, the communication process portion 150-1 transmits the sub-auxiliary information lists 125-2 to 125-P to the process units 126-2 to 126-P through the communication path 300, respectively.

The process units 126-L (where $2 \leq L \leq P$) other than the process unit 126-1 do not have the internal sort buffer 141, the internal sort process portion 120, and the list dividing process portion 140. Instead, the process units 126-L have the merge process portion 160-L, the merging output buffer 143-L, and the communication process portion 150-L.

The communication process portion 150-L receives the sub-auxiliary information list 126-L from the communication process portion 150-1 of the process unit 126-1 through the communication path 300.

The merge process portion 160-1 reads the divided information records of the sub-auxiliary information list 125-1 in succession from the beginning. Blocks having the block identifiers of the divided information records are read from the sort objective lists 122-1 to 122-L in the intermediate file 260 and the blocks are stored in buffers 142-1-i that are empty (where $1 \leq i \leq L$) of the merge input buffers 142-1-1 to 142-1-L. The L-way merge process is performed for L blocks in the merge input buffers 142-1-1 to 142-1-L. The records are output to the merge output buffer 143-1 in the descending order of the values of the sort keys. However, the records with the sort key values smaller than the forward boundary value and the records with the sort key values larger than or equal to the backward boundary value are not output. When the merge output buffer 143-1 becomes full, the content of the output buffer 143-1 is added to the sorted list 123-1. Thereafter, the L-way merge process is performed again. The result of the merge process is output to the merge output buffer 143-1.

The merge process portion 160-L of each of the process units 126-L (where $2 \leq L \leq P$) performs the L-way merge process for L blocks having block identifiers of the block information records registered in the sub-auxiliary information list 125-L with the merge input buffer 142-L corresponding to the sub-auxiliary information list 125-L received by the communication process portion 150-L as with the merge process portion 160-1 of the process portion 126-1. Thus, the merge process portion 160-L inserts records into the merge output buffer 143 in the descending order of the sort key values of the records.

Next, the operation of the above-described parallel merge and sort process apparatus will be described.

In this apparatus, the process unit 126-1 becomes a master unit that allocates tasks to other process units 126-2 to 126-P.

With reference to a flow chart shown in FIG. 6, the operation of the process unit 126-1 will be described.

Figure 6:
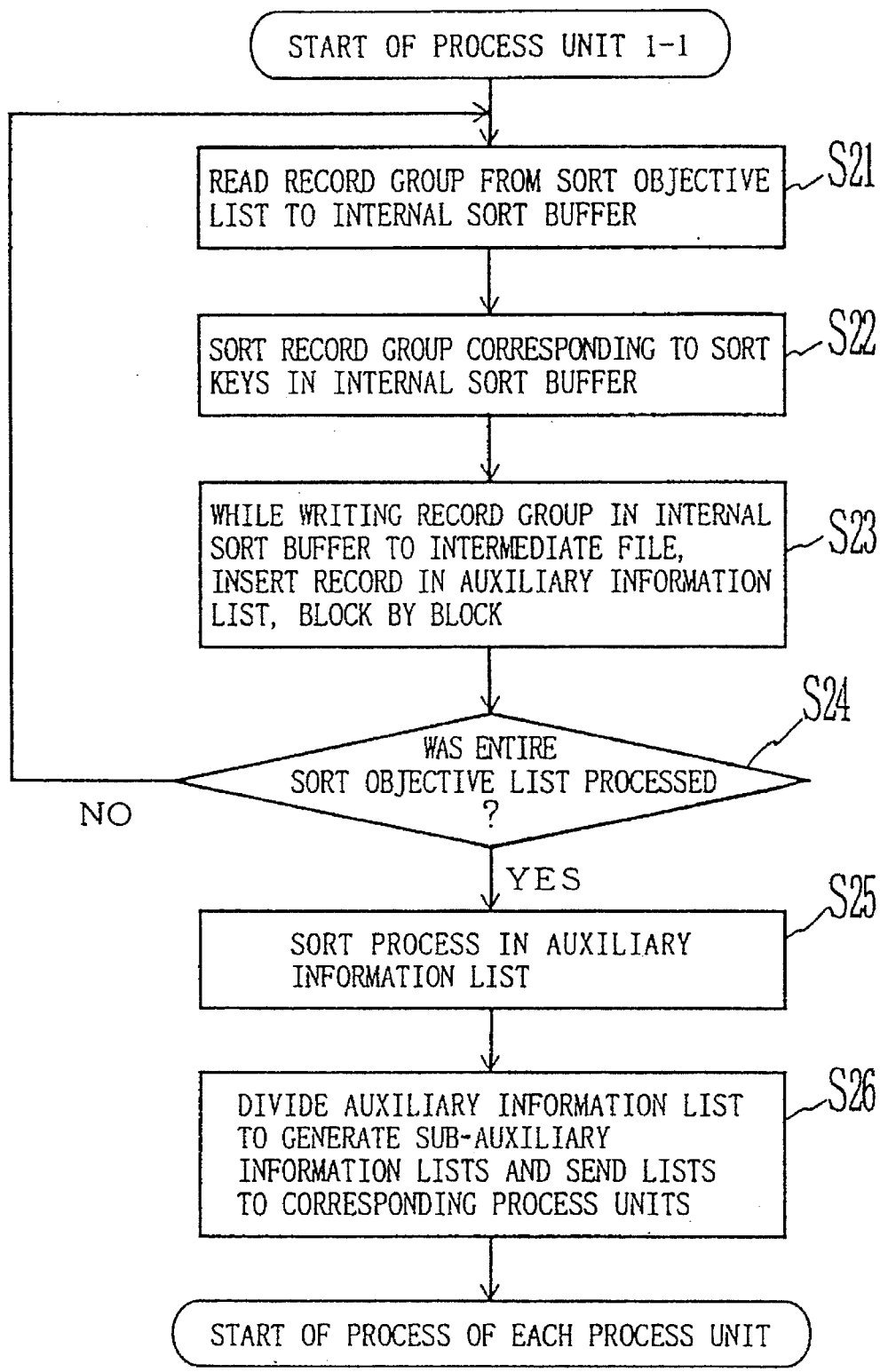
FIG. 6 is a flow chart for explaining the operation of a process unit 1—1 shown in FIG. 5.

Before the process of the flow chart shown in FIG. 6 is started, the contents of the internal sort buffer 141, the merge input buffer 142-1, and the merge output buffer 143-1 are cleared in an initializing process. In addition, the auxiliary information list 124 and the sub-auxiliary information list 125-1 stored in the main memory are emptied. Moreover, the intermediate file 260 and the sorted list 270 are generated in the memory unit 200. At this point, both the intermediate file 260 and the sorted list 270 are empty.

1. A record group with a predetermined number of records is read from the sort objective list 121 in the memory unit 200 to the internal sort buffer 141 (at step S21 of FIG. 6). The internal sort process unit 120 sorts the record group corresponding to sort keys (at step S22 of FIG. 6).

2. The sorted record group that is a single sorted merge objective list 122-j (where $1 \leq j \leq L$) stored in the internal sort buffer 141 is written to the intermediate file 260 of the memory unit 200. At this point, the first record of each block with a predetermined size is selected as a representative record. The value of a sort key of the representative record and an identifier of the block are paired as one block information record. This block information record is added to the first auxiliary information list 124 (at step S23 of FIG. 6).

3. The above-described steps 1 and 2 are continued until the entire sort objective list 121 is completely processed (at step S24 of FIG. 6). Thus, L sorted merge objective lists 122-1 to 122-L are generated in the intermediate file 260.

4. The internal sort process portion 120 sorts block information record groups registered in the first auxiliary information list 124 in the ascending order or descending order of sort keys of the block information records (at step S25 of FIG. 6).

5. The auxiliary information list dividing process portion 140 divides the second auxiliary information list 124' into P sub-auxiliary information lists 125-1 to 125-P. The communication process portion 150-1 transmits the sub-auxiliary information lists 125-2 to 125-P, other than the sub-auxiliary information list 125-1 allocated to the process unit 126-1, to the process units 126-2 to 126-P, respectively, through the communication path 300.

When the above described sub-auxiliary information lists 125-2 to 125-P are transmitted, the information about the forward boundary value and the backward boundary value set for each of the lists 125-2 to 125-P is transmitted to the corresponding process units 126-2 to 126-P (step S26 in FIG. 6).

In the above-described embodiment, the steps 1 to 5 are performed by one process unit 126-1. However, these steps may be shared by a plurality of process units 126-1 to 126-P.

After the process unit 126-1 transmits the sub-auxiliary information lists 125-2 to 125-P to the other process units 126-2 to 126-P, respectively, the process units 126-i (where $1 \leq i \leq P$) perform the following operations. The operations of the process units 126-i will be described with reference to a flow chart of FIG. 7.

6. The communication process portion 150-j of the process unit 126-j ($2 \leq j \leq P$) receives the sub-auxiliary information list 125-j from the process unit 126-1 through the communication path 300 (at step S31 of FIG. 7).

7. Each of the process units 126-j reads block information records of the sub-auxiliary information list 125-i in succession from the beginning. The merge objective lists 122-1 to 122-L stored in the intermediate file 260 corresponding to block identifiers of the block information records are stored successively in the merge input buffers 142-i-1 to 142-i-L (at steps S32 to S34 of FIG. 7).

Thus, L blocks are stored in the L merge input buffers 142-i-1 to 142-i-L, respectively.

8. The merge process portion 16-i performs an L-way merge process for L blocks stored in the merge input buffers 142-i-1 to 142-i-L and inserts records into the merge output buffer 143-i in the descending order of sort key values of the records (at step S35 of FIG. 7). However, records with sort key values smaller than the forward boundary value of the sub-auxiliary information list 25-i and records with sort key values larger than or equal to the backward boundary value thereof are not output. When one of the merge input buffers 142-i-1 to 142-i-L becomes empty, the next record is retrieved from the sub-auxiliary information list 125-i and a block corresponding to the block identifier of the block information record is written from the merge objective lists 122-1 to 122-L stored in the intermediate file 260 to the empty merge input buffer 142-i-k (where 1≦k≦L) (at steps S38 → to S32 to S34 of FIG. 7). When the merge output buffer 143-i becomes full, the content therein is added to an area 123-i of the sorted list 33 and the merge output buffer 143-i is emptied (at steps S36 and S37 of FIG. 7).

9. The step 8 is continued until all block information records in the sub-auxiliary information list 125-i are completely processed.

10. The merge process portion 160-i performs the merge process until all the merge input buffers 142-i-1 to 142-i-L become empty (at step S38 of FIG. 7) and inserts the records in the merge output buffer 143-i in the descending order of sort key values of the records. However, records with sort key values smaller than the forward boundary value of the sub-auxiliary information list 25-i and records with sort key values larger than or equal to the backward boundary value thereof are not output. At this point, when the merge output buffers 26 become full, the contents thereof are added to an area 143-i of the sorted list 33 and the merge output buffer 143-i is emptied. The steps 8, 9, and 10 correspond to steps S32 to S38 of FIG. 7.

11. When there is a record left in the merge output buffer 143-i, the content thereof is added to the sorted list 123-i (at step S39 of FIG. 7) and the process is completed.

Next, with reference to FIGS. 8 to 11, a practical example of the parallel merge and sort process according to the embodiment of the present invention will be described.

Other process units 1-2 to 1-P other than the process unit 1-1 informs the process unit 1-1 of the completion of a merging process through their own communication process portions 150-2 to 150-P via the communication path 300.

The process unit 1-1 determines that the parallel merging/ sorting processes have been completed by receiving the information from the other process units 1-2 to 1-P.

Figure 8:
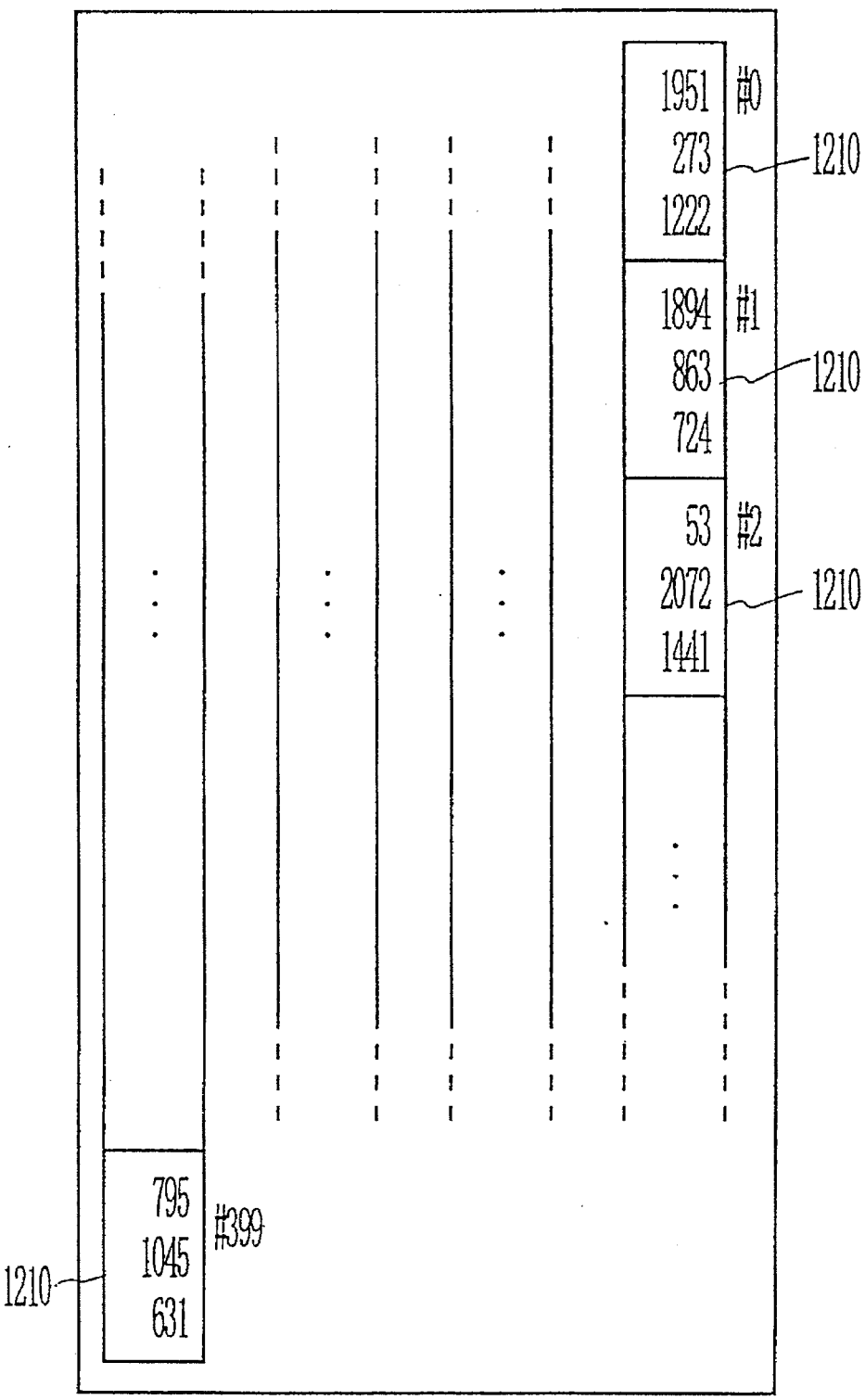
FIG. 8 is a schematic diagram showing a practical example of a list to be merged and sorted in parallel.

FIG. 8 is a schematic diagram showing the content of a sort objective list 121 to be sorted in the ascending order of sort key values. The first record of the sort objective list 121 is present at an upper right position of FIG. 8. The last record of the sort objective list 121 is present at a lower left position of FIG. 8. Each square frame 1210 of the sort objective list 121 is the above-mentioned block. In this example, the sort objective list 121 is formed of 400 blocks 1210 with block identifiers #0 to #399 that are allocated in the order of arrangement and equal to block numbers. Each block 1210 is occasionally equivalent to an access unit of the memory unit 200. Normally, the size of each block is in the range from several hundred bytes to several thousand bytes. In addition, each block is formed of a large number of records. For simplicity, it is assumed that each block is formed of three records. Three numeric values in each block 1210 represent the values of sort keys of the records. For example, the block #0 is formed of three records having sort key values 1951, 273, and 1222.

In this example, four merge objective lists 122-1 to 122-4 are generated and merged in parallel by two process units 126-1 and 126-2.

The internal sort process portion 120 of the process unit 126-1 shown in FIG. 5 sorts the sort objective list 121 shown in FIG. 8 while generating the first auxiliary information list 124. FIG. 9A shows four merge objective lists 122-1 to 122-4 sorted by the sort process. In other words, FIG. 9A shows part of the contents of the sorted merge objective lists 122-1 to 122-4 upon completion of the steps S21 to S24 shown in FIG. 4. FIG. 9B shows part of the contents of the first auxiliary information list 124 corresponding to the sorted merge objective lists 122-1 to 122-4.

In each of the sorted merge objective lists 122-1 to 122-4 shown in FIG. 9A, the uppermost block 1211 is a first element. These blocks are arranged in descending order. In the sort objective list 121 shown in FIG. 8, sort key values are arranged at random. However, in the sorted merge objective lists 122-1 to 122-4, sort key values are arranged in ascending order.

In the first auxiliary information list 124, the first element and the last element are placed in the uppermost position and the lowermost position, respectively. The first auxiliary information list 124 is an index of the sorted merge objective lists 122-1 to 122-4. Each element 1241 is block information as an index of blocks. A numeric value on the right of each block information record 1241 represents the block identifier of a block 1211. A numeral value on the left of each block information record 1241 represents the sort key value of the first record of the block 1211.

Upon completion of the steps S21 to S24 shown in FIG. 6, as shown in FIG. 9A, the block information records 1241 in the auxiliary information list 124 are arranged in the ascending order of block identifiers.

The internal sort process portion 120 sorts the block information records in the first auxiliary information list 124 shown in FIG. 9B in the ascending order of the sort key values at step S15 shown in FIG. 6. FIGS. 10A and 10B show part of the contents of the sorted merge objective lists 122-1 to 122-4 and part of the content of the second auxiliary information list 124' obtained by the sort process upon completion of the step S15 shown in FIG. 6. In FIG. 9B, the divided record group 1241 of the first auxiliary information list 124 is arranged in the ascending order of the block identifiers. Thus, in the second auxiliary information list 124' shown in FIG. 10B, the block information records 1241 are arranged in the ascending order of the sort key values.

The auxiliary information list dividing process portion 140 shown in FIG. 5 divides the second auxiliary information list 124' shown in FIG. 10B into two sub-auxiliary information lists 125-1 and 125-2 at step S26 shown in FIG. 6. FIGS. 11A and 11B show the two sub-auxiliary information lists 125-1 and 125-2 into which the second auxiliary information list 124' is divided.

The sub-auxiliary information list 125-1 is allocated to the first process unit 126-1. On the other hand, the sub-auxiliary information list 125-2 is allocated to the second process unit 126-2. The process units 126-1 and 126-2 preform the merge process corresponding to the sub-auxiliary information lists 125-1 and 125-2 and generate sorted lists 123-1 and 123-2, respectively.

Next, the method for dividing the second auxiliary information list 124' into the two sub-auxiliary information lists 125-1 and 125-2 will be described in detail.

In the second auxiliary information list 124' shown in FIG. 10B, a dividing point is obtained so that the number of block information records of the first sub-auxiliary information list 125-1 becomes nearly equal to that of the second sub-auxiliary information list 125-2. In this example, since the source objective list 121 is formed of 400 blocks in total, the second auxiliary information list 124' has 400 records. Thus, the dividing point of the auxiliary information list 124' is between the 200th block information record and the 201st block information record. Consequently, the dividing point 1243, which divides the second auxiliary information list 124' into two portions, is present between the block information record 1241 [1027, #42]and the block information record 1241 [1037, #152].

From the definition of the above-mentioned forward boundary value and the backward boundary value, the backward boundary value of the first sub-auxiliary information list 125-1 becomes "1037". This is because the sort key value of the first block information record 1241 of the second sub-auxiliary information list 125-2 is "1037". Since the sort key value of the first block information record 1241 is "1", the forward boundary value becomes "1".

In the case of the sub-auxiliary information list 125-2, since the sort key value of the first block information record 1241 is "1037", the forward boundary value becomes "1037". Since there is no sub-auxiliary information list followed by the sub-auxiliary information list 125-2, the backward boundary value becomes for example "∞" (infinity).

Since the sub-auxiliary information list 125-2 is preceded by the sub-auxiliary information list 125-1, all blocks that may have sort key values smaller than the forward boundary value "1037" should be extracted from the sub-auxiliary information list 125-1 and added to the beginning of the sub-auxiliary information list 125-2. Thus, the blocks 1241 with contents [1012, #248], [1023, #355], and [1027, #42] are extracted and added to the beginning of the sub-auxiliary information list 125-2. Since the sort key values of the block information records 1241 with block identifiers "#249", "#356", and "#43" are "1119", "1039", and "1073", respectively, the block 1211 corresponding to the block information record 1241 with [1012, #248] may have a record with a sort key value in the range from "1038" to "1118". Likewise, the block 1211 corresponding to the block information record 1241 with [1023, #355] may have a record with a sort key value "1038". The block 1211 corresponding to the block information record 1241 with [1027, #42] may have a record with a sort key value in the range from "1038" to "1072". Thus, such blocks should be added.

Consequently, in this example, as shown in FIGS. 11A and 11B, the first sub-auxiliary information list 125-1 having blocks ranging from [1, #300] to [1027, #42] and the second sub-auxiliary information list 125-2 having blocks ranging from [1012, #248] to [2062, #399] are generated from the second auxiliary information list 124'

In the sorted merge objective lists 122-1 to 122-4 shown in FIG. 11C, blocks hatched from upper right to lower left (including blocks hatched from upper right to lower left and from upper left to lower right) correspond to the first sub-auxiliary information list 125-1. These blocks are referred to as segment Seg1. On the other hand, block hatched from upper left to lower right (including blocks hatched from upper left to lower right and from upper right to lower left) correspond to the second sub-auxiliary information list 125-2. These blocks are referred to as segment Seg2.

Thus, the segment Seg1 of the blocks hatched from upper right to lower left (including blocks hatched from upper right to lower left and from upper left to lower right) corresponding to the first sub-auxiliary information list 125-1 has all blocks 1211 that may have records with sort key values smaller than "1037". On the other hand, the segment Seg2 of the blocks hatched from upper left to lower right (including blocks hatched from upper left to lower right and from upper right to lower left) has all blocks 1211 that may have records with sort key values more than or equal to "1037".

Figure 7:
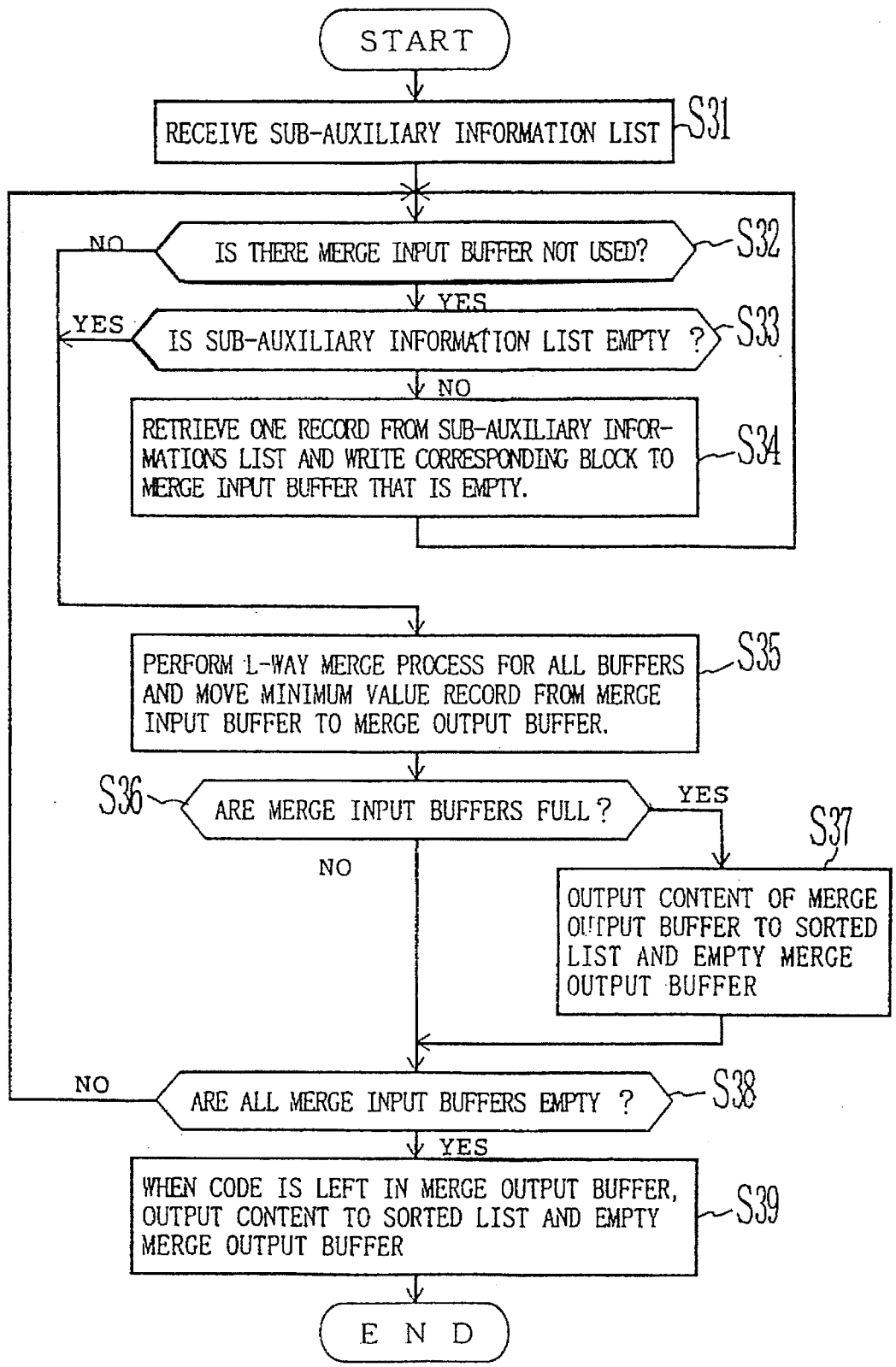
FIG. 7 is a flow chart for explaining the operations of process units 1—1 to 1-P shown in FIG. 5.

When the two sub-auxiliary information lists 125-1 and 125-2 are generated, the two process units 126-1 and 126-2 perform the process shown in the flow chart of FIG. 7 corresponding to the sub-auxiliary information lists 125-1 to 125-2 in parallel, thereby increasing the speed of the merge process.

In addition, the merge objective lists 122-1 to 122-4 are divided into the two segments Seg1 and Seg2 corresponding to the first sub-auxiliary information list 125-1 and the sub-auxiliary information list 125-2. In this case, the segments Seg1 and Seg2 include the common blocks, which are hatched from upper right to lower left and from upper left to lower right. The common blocks 1211 are allocated corresponding to the block information records 1241 shared by the first and second sub-auxiliary information lists 125-1 and 125-2.

The block information records 1241 shared by the sub-auxiliary information lists 125-1 to 125-P are referred to as "interference portions of dividing point" or simply "interference portions". The "interference portions of dividing point" correspond to the blocks 1211 shared by a plurality of segments Seg1 to SegP.

Each process unit 126-i (where $1 \leq i \leq P$) should not always output records corresponding to the interference portions of blocks allocated thereto (namely, segment Segi) to the sorted list 123-i.

For instance, in the example shown in FIGS. 11A, 11B, and 11C, since the first process unit 126-1 performs the merge process corresponding to the first sub-auxiliary information list 125-1, blocks 1211 with identifiers #42, #248, and #355 are contained in a block group to be merged. However, this block group includes blocks having records with sort key values larger than or equal to "1037" (for example, "1035" and "1060" in block #42, "1115" and "1117" in block #248, and "1033" in block #355) that are not output to the sorted list 123-i. To prevent records with improper sort key values from being output, when each process unit 126-i outputs the result of the merge process to the sorted list 123-i, it determines whether the sort key value is larger than or equal to the forward boundary value and less than the backward boundary value. Thus, records with sort keys values less than the forward boundary value in the sub-auxiliary information list and records with sort key values larger than or equal to the backward boundary value are not output.

Thus, the process units 126-1 and 126-2 output the sorted lists 123-1 to 123-2, each of which is formed of a plurality of blocks 1212, respectively. By linking the sorted list 123-1 to 123-2, the final sorted list 270 is formed.

As described above, in the preferred embodiment, the auxiliary information list 124 is generated in the unit of blocks with a fixed length. However, it should be noted that the present invention can be applied to blocks with a variable length. In this case, as information for accessing each block with a variable length in the sorted merge objective lists 122-1 to 122-L of the intermediate file 260, instead of the block identifiers, a pair of offset data of block with a variable length measured from the beginning of the intermediate file 260 and the size thereof are used.

Figure 13:
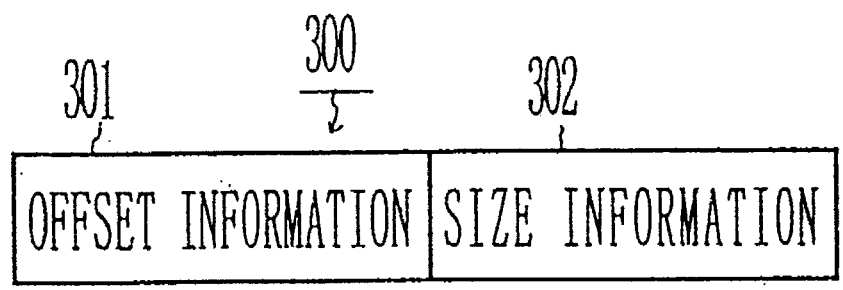
FIG. 13 is a schematic diagram showing an example of the format of a block identifier in the case that a source objective list is formed of variable length blocks.

FIG. 13 shows an example of the format of the substitute information 300 of the block identifier. Offset information 301 represents the offset of the start portion of the variable length block measured from the beginning of the intermediate file 260 in bytes. Size information 302 represents the size of the variable length block in bytes.

In addition, according to the present invention, as is clear from the above description, the auxiliary information list 124 can be divided for the parallel merge and sort process without need to perform the process for reading blocks 1211 from the sorted merge objective lists 122-1 to 122-L of the intermediate file 260 in the memory unit 200. Thus, the process for generating the sub-auxiliary information lists 125-1 to 125-P with the auxiliary information list 124 can be performed in the main memory at high speed.

As described above, according to the present invention, the merge and sort process can be performed by a plurality of process units 126-1 to 126-P. Thus, the merge and sort process can be performed by a parallel processor system that has been commonly employed in recent years. In addition, the sort function can be accomplished by a group of workstations connected by a network such as LAN. Moreover, using dedicated hardware, the sort process according to the present invention can be accomplished.

Next, a parallel processor system according to an embodiment of the present invention will be described. There are many types of parallel processor systems such as loose-coupled type and close-coupled type. In this embodiment, a close-coupled type or bus-connected type parallel processor system according to the present invention will be described.

Figure 14:
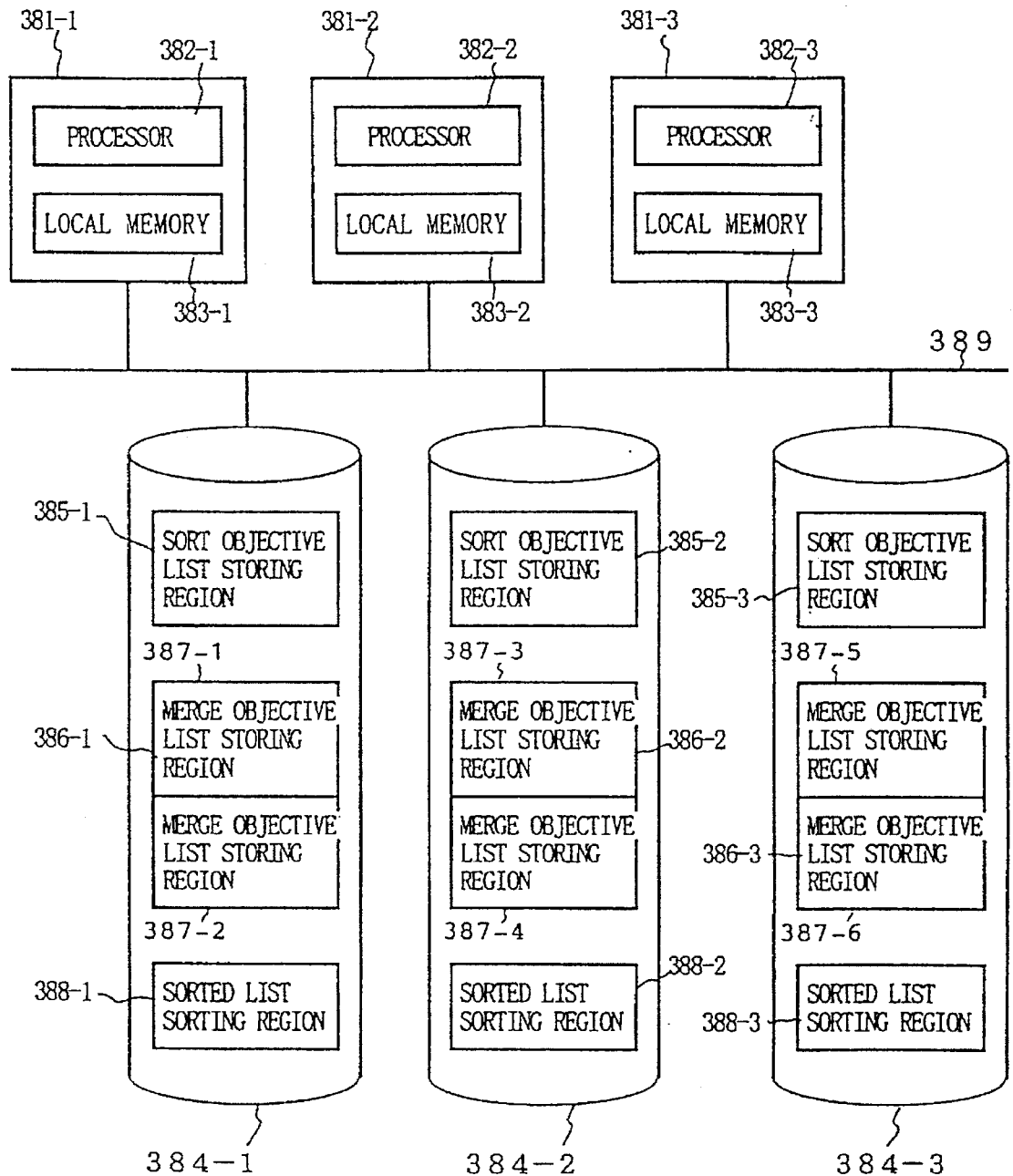
FIG. 14 is a block diagram showing a construction where the parallel merge and sort process apparatus shown in FIG. 5 is implemented to a loose-coupled multi-processor system.

FIG. 14 is a block diagram showing the construction of a parallel processor system according to the present invention. In this embodiment, processor modules 382-1 to 382-3 correspond to the process units 126-1 to 126-3 shown in FIG. 5, respectively. Three disk units 384-1 to 384-3 correspond to the memory unit 200 shown in FIG. 5. The three processor modules 382-1 to 382-3 and the three disk units 384-1 to 384-3 are connected to each other through a common bus 389. The processor modules 381-1 to 381-3 have processors (CPUs) 382-1 to 382-3 and local memories 383-1 to 383-3, respectively.

The sort objective list 121 shown in FIG. 5 is divided into three portions and stored in sort objective list storing regions 385-1 to 385-3 of the three disk units 384-1 to 384-3. The intermediate file 260 shown in FIG. 5 is divided into three portions and stored in intermediate file storing regions 386-1 to 386-3 in the three disk units 384-1 to 384-3. The sorted list 270 shown in FIG. 5 is divided into three portions and stored in sorted list storing regions 388-1 to 388-3 in the three disk units 384-1 to 384-3.

The storage capacity of the internal sort buffer 141 in the local memory 383-1 is 1/6 times the storage capacity of the sort objective list 121. Thus, six sorted merge objective lists 122-1 to 122-6 are generated. The sorted merge objective lists 122-1 to 122-6 are paired and stored in sorted merge objective list storing regions 387-1 to 387-6 of the intermediate file storing regions 386-1 to 386-3. Since the three processor modules 382-1 to 382-3 are provided in the system, three sorted lists 123-1 to 123-3 are generated. The sorted lists 123-1 to 123-3 are stored in the sorted list storing regions 388-1 to 388-3 in the disk units 384-1 to 384-3, respectively.

The internal sort buffer 141 and the first auxiliary information list 124, which are shown in FIG. 5, are prepared and generated in the local memory 383-1 of the processor module 381-1.

The internal sort process portion 120 shown in FIG. 5 is accomplished by for example software. This software is stored in the local memory 383-1 of the processor module 381-1 and executed by the processor 382-1. The software sorts a block group of the sort objective list 121 written from the sort objective list storing regions 385-1 to 385-3 of the disk units 384-1 to 384-3 to the internal sort buffer 141 corresponding to sort keys by an algorithm such as the quick heap sort technique. Thus, six merge objective lists 122-1 to 122-6 are generated. These merge objective lists 122-1 to 122-6 are paired and stored in the intermediate file storing regions 386-1 to 386-3 of the three disk units 384-1 to 384-3. The software also generates the block information records for the blocks of the six merge objective lists 122-1 to 122-6 and registers these records in the first auxiliary information list 124. The software sorts the first auxiliary information list 124 corresponding to sort key values of the block information records and generates the second auxiliary information list 124'.

The auxiliary information list dividing process portion 140 shown in FIG. 5 is accomplished by for example software. The software is stored in the local memory 383-1 of the processor module 381-1. The software is executed by the processor 382-1. The software divides the second auxiliary information list 124' into three sub-auxiliary information lists 125-1 to 125-3 corresponding to the above-mentioned dividing method.

The merge process portion 160-1 shown in FIG. 5 is accomplished by for example software. The software is stored in the local memory 383-1 of the processor module 381-1. The program is executed by the processor 382-1. The software generates the sorted list 123-1 by an algorithm such as tournament technique and stores the list in the sorted list storing region 388-1 of the disk unit 384-1.

The merge process portions 160-2 and 160-3 shown in FIG. 5 are accomplished by for example software. The software is stored in the local memories 383-2 and 383-3 of the processor modules 381-2 and 381-3. The merge process portions 160-2 and 160-3 are accomplished by an algorithm similar to that of the merge process portion 160-1. The algorithm is executed by the processors 382-2 and 382-3 of the processor modules 381-2 and 381-3.

The merge process portion 160-2 generates the sorted list 122-2 corresponding to the sub-auxiliary information list 125-2 received from the processor module 381-1 and stores the list in the sorted list storing region 388-2 of the disk unit 384-2. The merge process portion 160-3 generates the sorted list 122-3 corresponding to the sub-auxiliary information list 125-3 received from the processor module 381-1 and stores the list in the sorted list storing region 388-3 of the disk unit 384-3.

The communication path 300 is accomplished by the common bus 389. The communication process portions 150-1 to 150-3 of the process units 126-1 to 126-3 are accomplished by bus interface of the processor modules 381-1 to 381-3 and communication process software stored in the local memories 383-1 to 383-3.

Figures 15A, 15B, 15C:
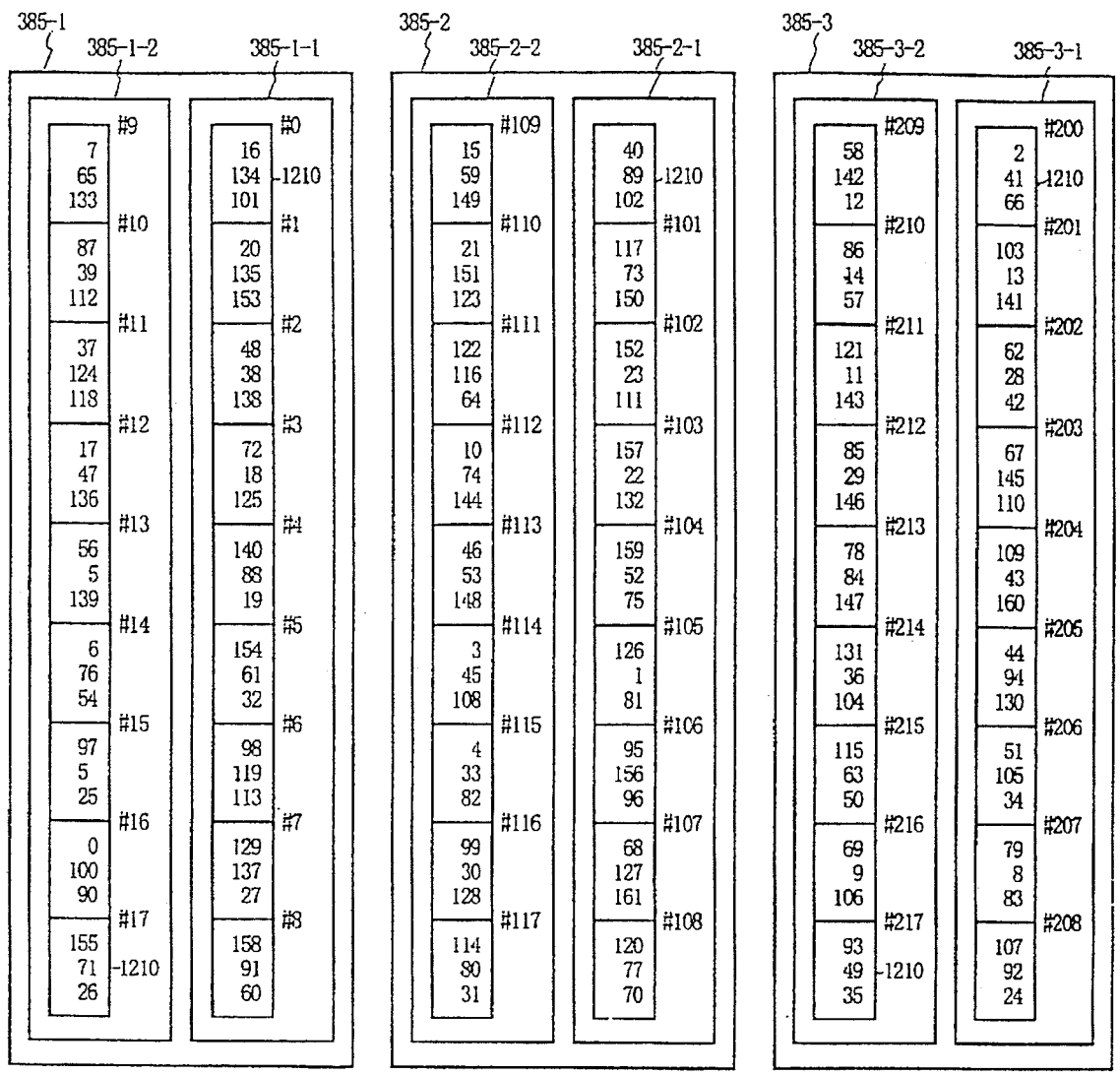
FIGS. 15A, 15B, and 15C are schematic diagrams showing three sort objective lists 385-1, 385-2, and 385-3, respectively.

FIGS. 15A to 15C show an example of the sort objective list 121 divided and stored in the sort objective list storing regions 385-1 to 385-3. In this example, the sort objective list 121 is formed of a total of 51 blocks 1211 with block identifiers #0 to #17, #100 to #117, and #200 to #217. The blocks 1211 with block identifiers #0 to #17 are stored in the sort objective list storing region 385-1. The blocks 1211 with block identifiers #100 to #117 are stored in the sort objective list storing region 385-2. The blocks 1211 with block identifiers #200 to #217 are stored in the sort objective list storing region 385-3.

The processor module 381-1 accesses the disk unit 384-1 to 384-3 in succession, reads the source objective list 121 shown in FIGS. 15A to 15C from the sort objective list storing regions 385-1 to 385-3, and writes the list to the internal sort buffer 141 of the local memory 383-1. Since the storage capacity of the internal sort buffer 141 is 1/6 times the storage capacity of the sort objective list 121, block groups 385-1-1, 385-1-2, 385-2-1, 385-2-2, 385-3-1, and 385-3-2, each of which is formed of nine blocks, shown in FIGS. 15A to 15C are sorted and stored in the internal sort buffer 141. After new blocks are generated, the six sorted merge objective lists 122-1 to 122-6 are stored in the intermediate file storing regions 386-1 to 386-3 of the disk units 384-1 to 384-3.

Figures 16A, 16B, 16C:
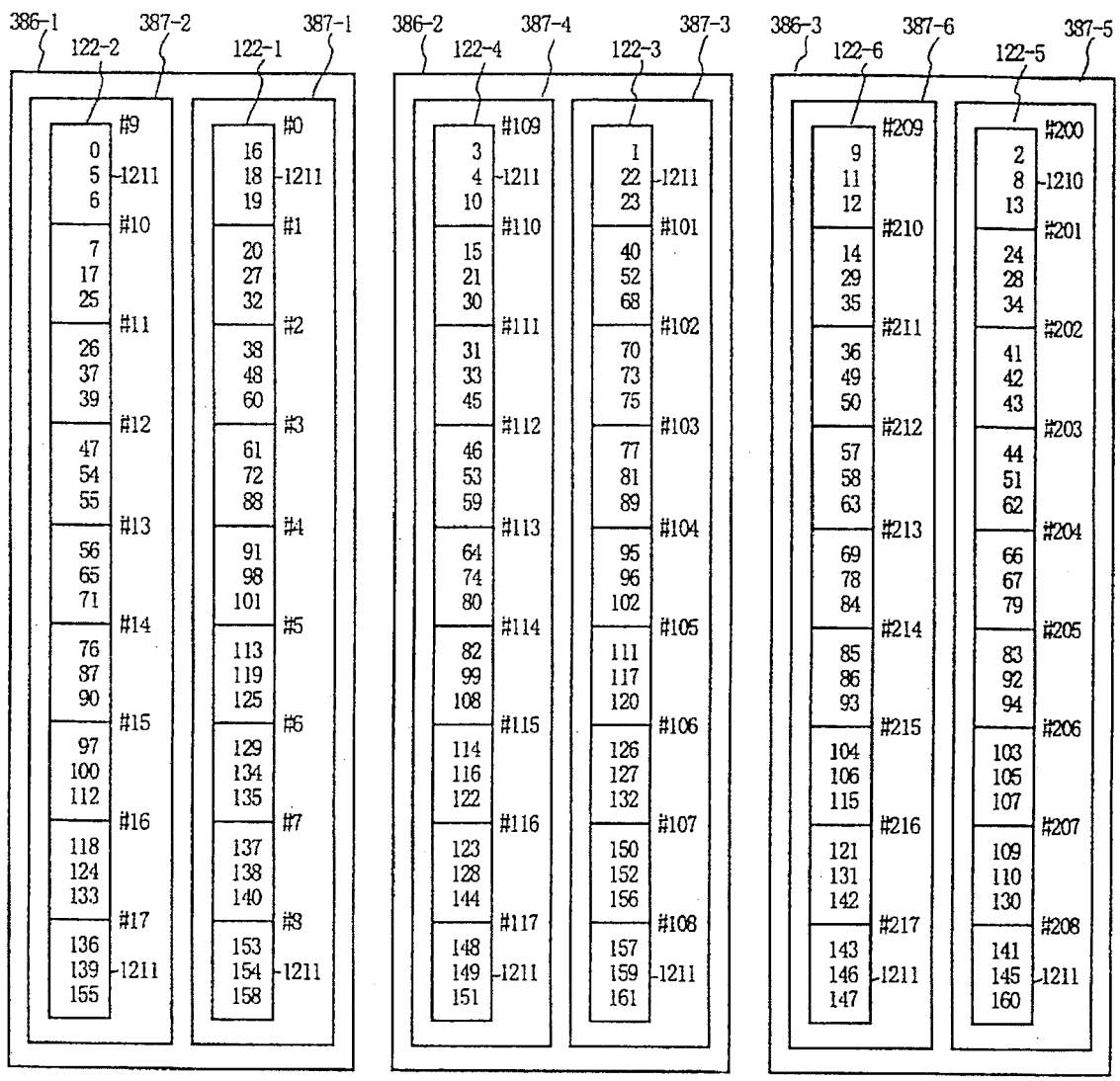
FIGS. 16A, 16B, and 16C are schematic diagrams showing the contents of sorted merge objective lists 122-1 to 122-2, 122-3 to 122-4, and 122-5 to 122-6 obtained by sorting the three sort objective lists 386-1, 386-2, and 386-3 corresponding to sort keys, respectively.

FIGS. 16A to 16C show the contents of the six sorted merge objective lists 122-1 to 122-6 stored in the intermediate file storing region 386-1 (merge objective list storing regions 387-1 and 387-2), the intermediate file storing region 386-2 (merge objective list storing regions 387-3 and 387-4), and the intermediate file storing region 386-3 (merge objective list storing regions 387-5 and 387-6).

FIG. 17 shows the content of the first auxiliary information list 124 generated by the processor module 381-1 along with the six sorted merge objective lists 122-1 to 122-6.

The divided information records 1241 in the first auxiliary information list 124 are sorted by the processor module 381-1 in the ascending order of sort keys. FIG. 18 shows the content of the second auxiliary information list 124' as the sorted result.

The processor module 381-1 divides the second auxiliary information list 124' into the three sub-auxiliary information lists 125-1 to 125-3 shown in FIGS. 19A to 19C corresponding to the above-described method.

Next, the method for generating the sub-auxiliary information lists 125-1 to 125-3 will be described step by step.

1. Two dividing points 1246 and 1247 are set to the second auxiliary information list 124' as shown in FIG. 18. Thus, the first sub-auxiliary information list 125-1 becomes a list of block information records 1241 with block identifiers in the range from #9 to #12. The second sub-auxiliary information list 125-2 becomes a list of block information records 1241 with block identifiers in the range from #13 to #207. The third sub-auxiliary information list 125-3 becomes a list of block information records 1241 with block identifiers in the range from #105 to #108.

2. For the first sub-auxiliary information list 125-1, "0" and "56" are set to the forward boundary value and the backward boundary value, respectively. For the second sub-auxiliary information list 125-2, "56" and "111" are set to the forward boundary value and the backward boundary value, respectively. For the third sub-auxiliary information list 125-3, "111" and "∞" (infinity) are set to the forward boundary value and the backward boundary value, respectively.

3. Since the first sub-auxiliary information list 125-1 is present in the second sub-auxiliary information list 125-2, all block information records 1241 corresponding to blocks that may have records with sort key values less than the forward boundary value (="56") are extracted from the first sub-auxiliary information list 125-1. Thus, five block information records 1241 with block identifiers #211, #2, #101, #203, and #112 are extracted in the ascending order of sort key values. These block information records 1241 are added to the beginning of the second sub-auxiliary information list 125-2 generated in the above step 1. This is because the block #211 may have records with sort key values in the range from "36" to "56", the block #2 may have records with sort key values in the range from "38" to "60", the block #203 may have records with sort key values in the range from "44" to "65", and the block #112 may have records with sort key values in the range from "46" to "63".

4. Next, with respect to the third sub-auxiliary information list 125-3 generated in the above-described step 1, the step 3 is performed for the second sub-auxiliary information list 125-2. Thus, block information records 1241 with block identifiers #114, #4, #15, #215, and #207 are extracted from the second sub-auxiliary information list 125-2. The extracted block information records are added to the third sub-auxiliary information list 125-3. This is because the block #114 may have records with sort key values in the range from "82" to "113", the block #4 may have records with sort key values in the range from "91" to "112", the block "15 may have records with sort key values in the range from "97" to "117", the block #215 may have records with sort key values in the range from "104" to "120", and the block #207 may have records with sort key values in the range from "109" to "140".

When the processor module 382-1 generates the three sub-auxiliary information lists 125-1 to 125-3 by the steps 1 to 4, it transmits the second and third sub-auxiliary information lists 125-2 to 125-3 to the processor modules 382-2 and 382-3 through the common bus 389, respectively. At this point, the processor module 382-1 also transmits the forward boundary value and the backward boundary value set for each list. The processor module 382-1 preferably transmits directory information of each block 1211 of the sorted objective lists 122-1 to 122-6 to the other processor modules 381-2 and 381-3. The directory information represents the intermediate file regions 386-1 to 386-3 of the disk units 384-1 to 384-3 into which each block 1211 is stored.

Each processor module 381-i (where $1 \leq i \leq 3$) generates the sorted list 122-i corresponding to the sub-auxiliary information list 125-i and its forward boundary value and the backward boundary value and stores the list in the sorted list storing region 388-i of the disk unit 384-i.

Figures 20A, 20B, 20C:
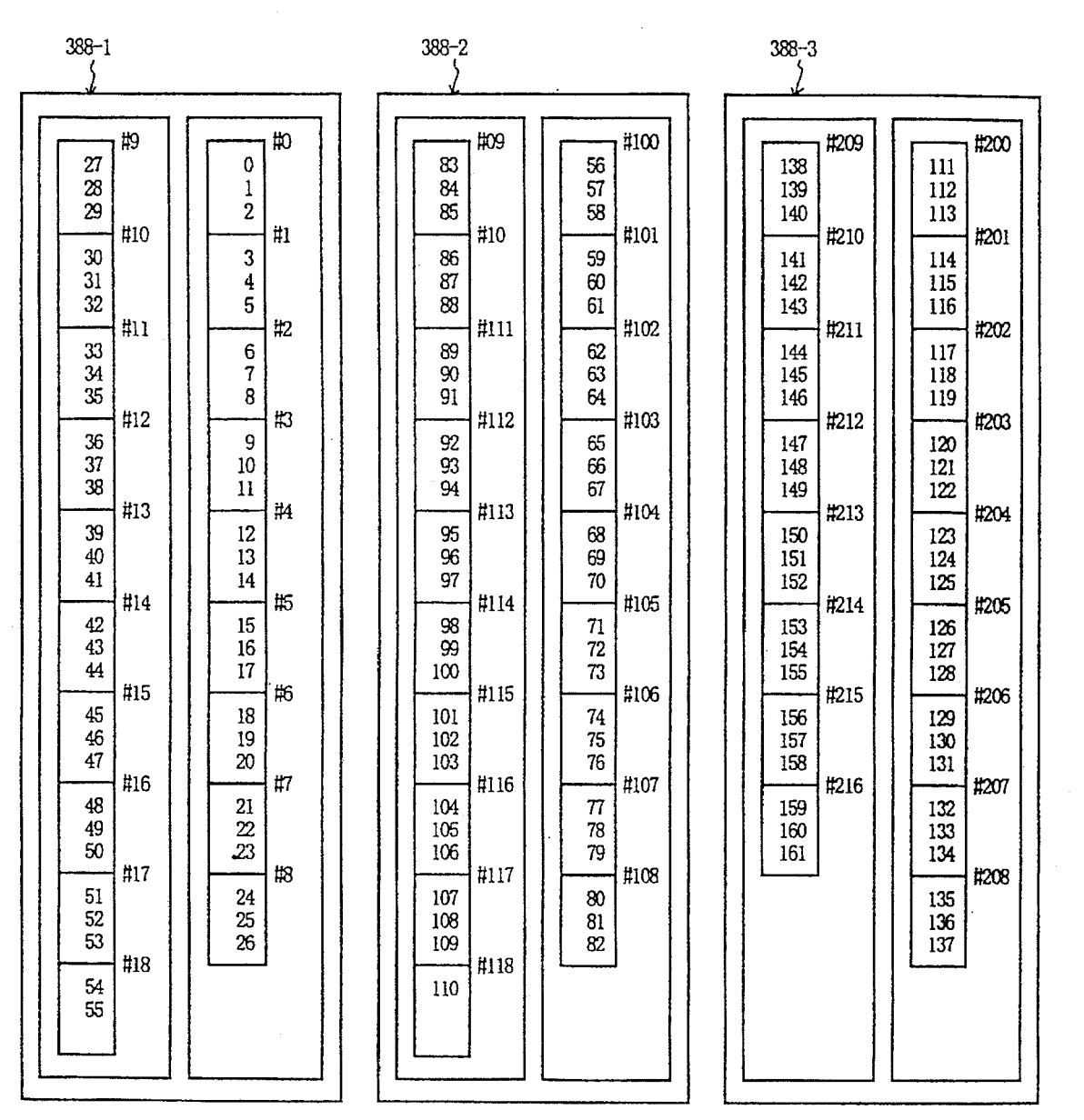

Thus, the sorted lists 123-1 to 123-3 as shown in FIGS. 20A to 20C are stored in the sorted list storing regions 388-1 to 388-3 of the disk units 384-1 to 384-3, respectively.

In the above embodiment, the sorting process for the sorted objective list 121 is performed independently by the processor module 381-1. However, other processor modules 381-2 and 381-3 can be provided with an internal sorting buffer 21 and an internal sorting process unit 22 so that the above described parallel sorting process can be performed by the three processor modules 381-1 to 381-3.

In this case, for example, the processor module 381-i (i=1, 2, 3) manages a part of the sorted objective list 121 stored in the sorted objective list storage area 385-i in the disk device 384-i. Then, the processor module 381-1 generates two merged objective lists 122-1 and 122-2 to be stored in the intermediate file storage area 386-1 in the disk device 384-1. Additionally, the processor module 381-2 generates two merged objective lists 122-3 and 122-4 to be stored in the intermediate file storage area 386-2 in the disk device 384-2. Furthermore, the processor module 381-3 generates two merged objective lists 122-5 and 122-6 to be stored in the intermediate file storage area 386-3 in the disk device 384-3.

Each processor module 381-i generates two auxiliary information lists respectively corresponding to the merged objective lists 122-(2i–1) and 122-2i generated by the module. Then, the processor modules 381-2 and 381-3 transmit their two auxiliary information lists to the processor module 381-1 via the shared bus 389.

Upon receipt of the auxiliary information lists from the other processor modules 381-2 and 381-3, the processor module 381-1 determines that the parallel sorting process for the sorted objective list 121 has been completed, merges its own auxiliary information list to generate a first auxiliary information list 124. The succeeding processes are performed similarly.

As described above, the parallel merge and sort process method according to the embodiment of the present invention can be accomplished by the parallel processor system shown in FIG. 14. It should be appreciated that the present invention is not limited to the system shown in FIG. 14. Instead, the present invention can be applied to a workstation or the like that is connected by a network such as LAN.

In the above-described first parallel merge and sort process method, when the first auxiliary information list 124 is generated, as a representative record of each block 1211, a record with the minimum sort key value is selected. Instead, a record with the maximum sort key value may be selected to accomplish the parallel merge process. This process is referred to as second parallel merge and sort process.

Next, with reference to the accompanying drawings, the second parallel merge and sort process method will be described.

Figures 21A, 21B:
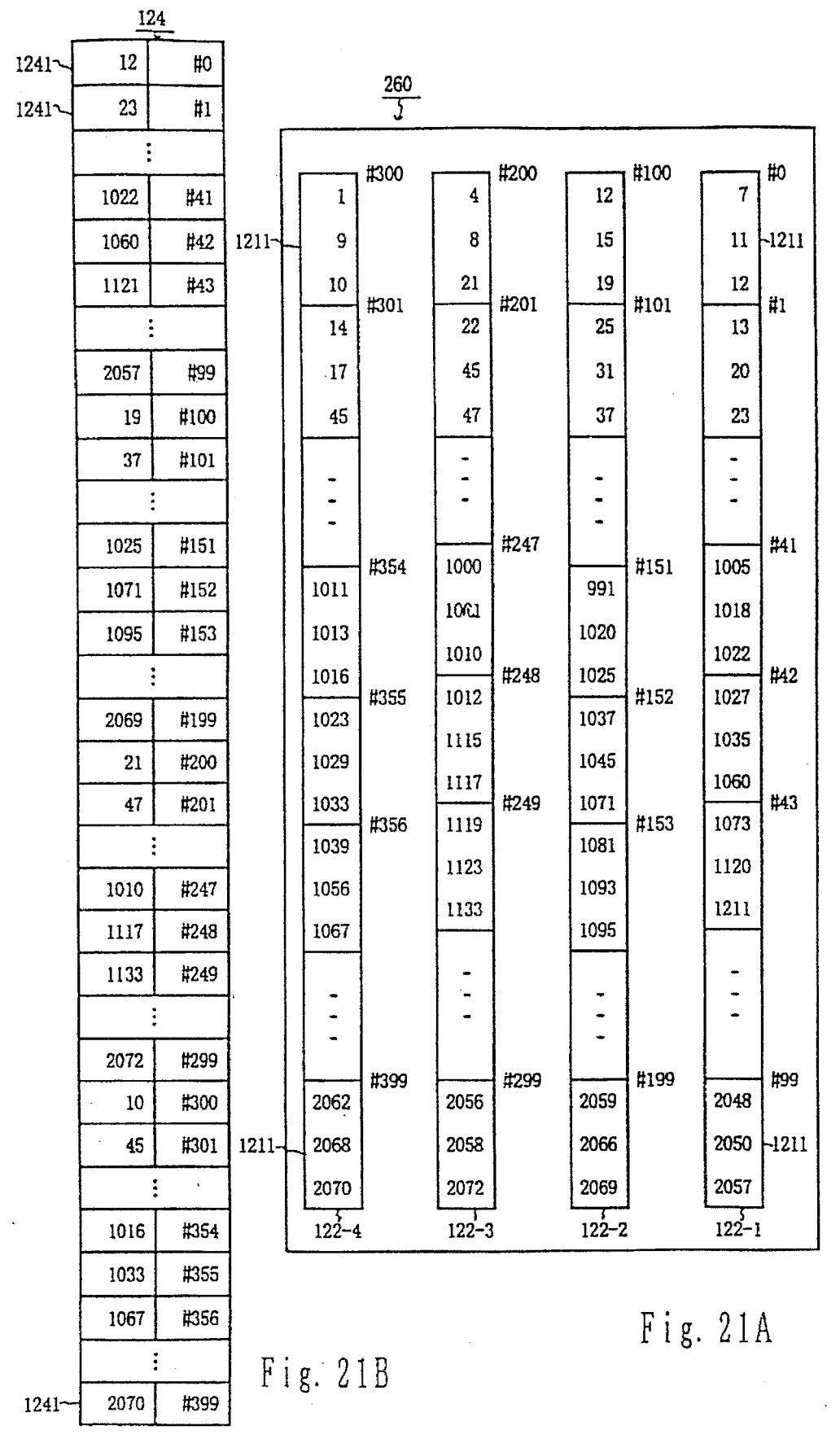

FIG. 21A shows the contents of the four sorted merge objective lists 122-1 to 122-4 generated by the internal sort process portion 120. These contents are the same as those shown in FIG. 9A. In this case, as a representative record of each block 1211, a record with the maximum sort key value is selected- The content of the first auxiliary information list 124 generated by the internal sort process portion 120 is shown in FIG. 21B. In other words, unlike with the first method, the sort key of each block information record 1241 is equal to the sort key of the maximum record.

Next, the internal sort process portion 120 sorts the first auxiliary information list 124 in the ascending order of the sort keys of the block information records 1241. Thus, the second auxiliary information list 124 shown in FIG. 22B is generated from the four sorted merge objective lists 122-1 to 122-4 shown in FIG. 22A.

Next, the auxiliary information list dividing process portion 140 divides the second auxiliary information list 124' into P sub-auxiliary information lists 125-1 to 125-P (where P=2). To do that, the second auxiliary information list 124' is divided into two equal portions. In this example, as shown in FIG. 22B, the two portions are divided at a dividing point 1244 between a block information record 1241 [1067, #356] and a block information record 1241 [1071, #152].

Thus, the block information records 1241 from the beginning of the second auxiliary information list 124' to [1067, #356] are temporarily allocated to the first sub-auxiliary information list 125-1. The block information records 1241 from [1071, #152] to the last of the second auxiliary information list 124' are temporarily allocated to the second sub-auxiliary information list 125-2.

Next, the forward boundary value and the backward boundary value are set to each of the first sub-auxiliary information list 125-1 and the second sub-auxiliary information list 125-2. For the first sub-auxiliary information list 125-1, "0" and "1067" are set to the forward boundary value and the backward boundary value, respectively. In other words, the minimum sort key value is set to the forward boundary value. The sort key value of the last block information record 1241 is set to the backward boundary value. For the second sub-auxiliary information list 125-2, "1067" and "2072" are set to the forward boundary value and the backward boundary value, respectively. In other words, when there is a preceding sub-auxiliary information list, the backward boundary value of the list is set to the forward boundary value of the following sub-auxiliary information list. The sort key value of the last divided information record 1241 is set to the backward boundary value.

Segments Seg1 and Seg2 defined by the first sub-auxiliary information list 125-1 and the second sub-auxiliary information list 125-2 are groups of records 1211 having sort key values larger than the forward boundary value and smaller than or equal to the backward boundary value.

Thus, for the first sub-auxiliary information list 125-1, block information records 1211 corresponding to blocks 1211 with sort key values smaller than or equal to the backward boundary value are extracted from the second sub-auxiliary information list 125-2. The extracted records 1211 are added to the last of the first sub-auxiliary information list 125-1. Thus, block information records 1241 with [1071, #152], [1117, #248], and [1121, #43] are extracted and these records 1241 are added to the end of the first sub-auxiliary information list 125-1 as shown in FIG. 23A.

In other words, since the sort key value of the representative record of the block #151 is "1025", the block #152 may have records with sort key values in the range from "1026" to "1065". In addition, since the sort key value of the representative record of the block #247 is "1010", the block number #248 may have records with sort key values in the range from "1011" to "1066". Moreover, since the sort key value of the representative record of the block #42 is "1060", the block #43 may have records with sort key values in the range from "1061" to "1066".

Figure 12:
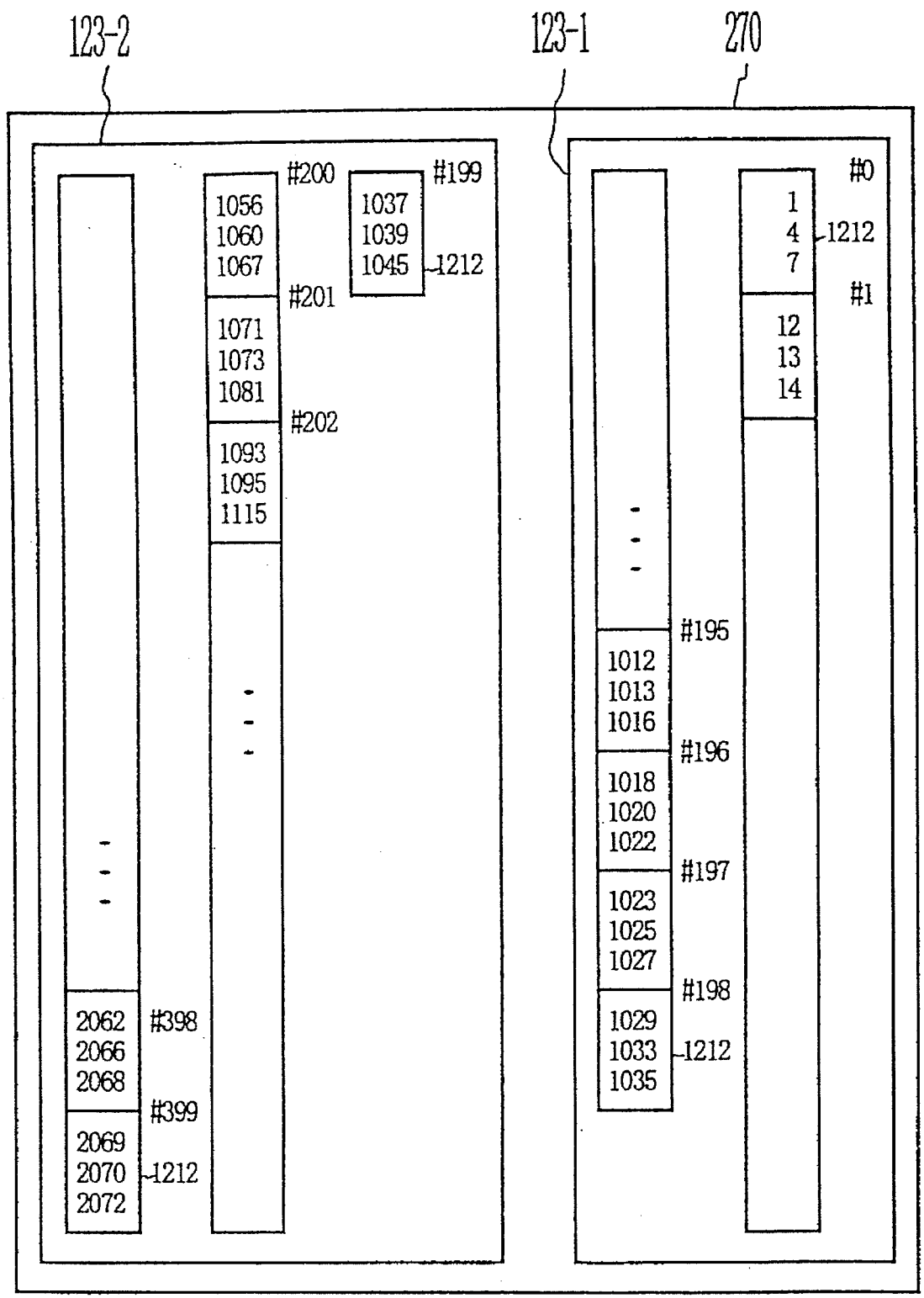
FIG. 12 is a schematic diagram showing the results of the merge and sort process of the sort objective list 121 shown in FIG. 8 performed by two process units 126-1 and 126-P shown in FIG. 5 corresponding to the sub-auxiliary information lists 125-1 and 125-2.
Figures 23A, 23B, 23C:
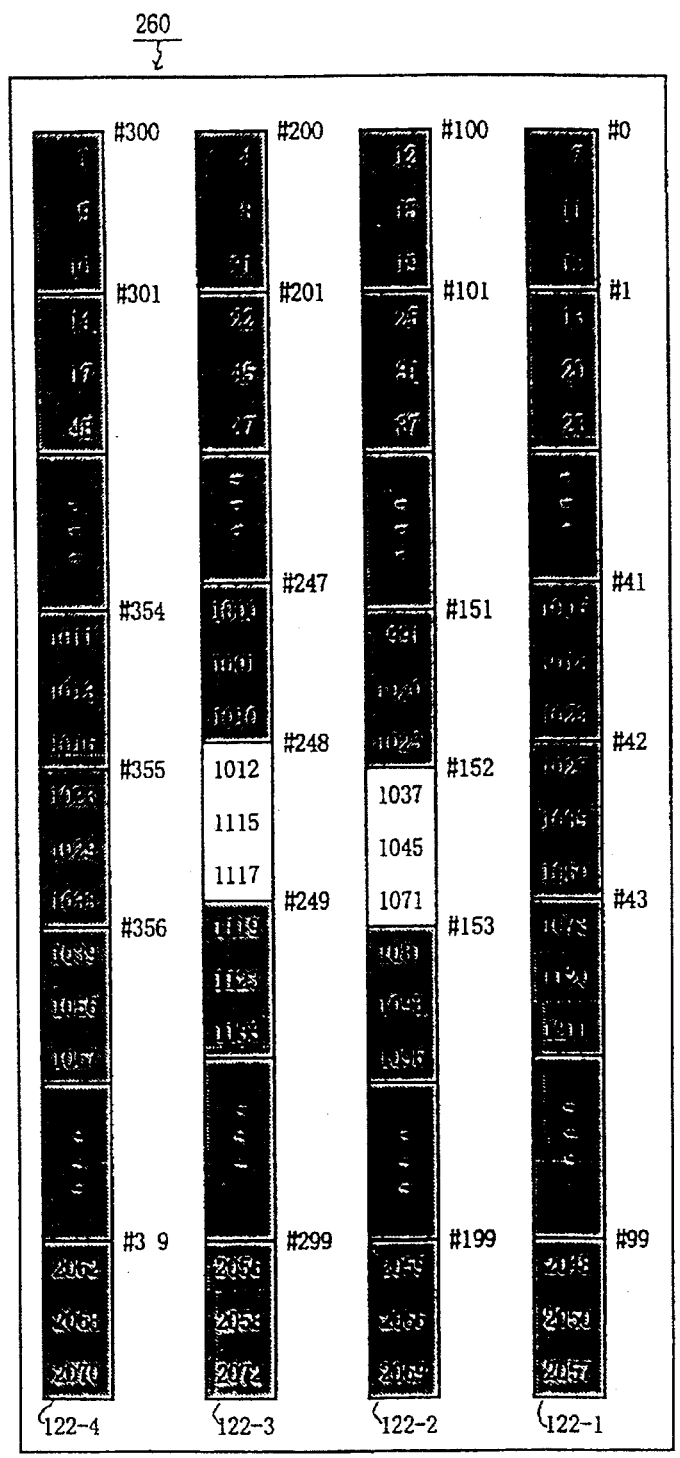
FIGS. 23A and 23B are schematic diagrams showing the contents of the first and second sub-auxiliary information lists 125-1 and 125-2 obtained by dividing the second auxiliary information list 124' shown in FIG. 22B.
FIG. 23C is a schematic diagram showing the contents of the sorted merge objective lists 122-1 to 122-4.

In such a manner, the first sub-auxiliary information list 125-1 and the second sub-auxiliary information list 125-2 shown in FIGS. 23A and 23B are generated. The merge process portions 160-1 and 160-2 of the process units 126-1 and 126-2 read the blocks 1211 from the four sorted merge objective lists 122-1 to 122-4 shown in FIG. 22C corresponding to the first sub information list 125-1, the second sub information list 125-2, and these forward boundary values and backward boundary values and merge them in parallel. Thus, as with the first method, the sort objective list 121 shown in FIG. 8 is sorted as shown in FIG. 12.

In the second parallel merge and sort process method, as with the above-described first parallel merge and sort process method, the second auxiliary information list 124' is divided into P sub-auxiliary information lists 125-1 to 125-P as shown in FIG. 4. With the P sub-auxiliary information lists 125-1 to 125-P, L sorted merge objective lists 122-1 to 122-L can be divided into P segments Seg1 to SegP.

In the above-described embodiments, when a representative record is selected from the blocks 1211 of the sorted merge objective lists 122-1 to 122-L, a record with the minimum sort key value (minimum record) or a record with the maximum sort key value (maximum record) is selected. However, it should be noted that a record with an intermediate sort key value can be selected as a representative record. In this case, the forward boundary value and the backward boundary value can be set in various manners. In addition, there may be a plurality of representative records. Thus, for one block 1211, a plurality of records may be selected as representative records. In this case, for example, the above-mentioned minimum record and the maximum record are selected as representative records. When such representative records are selected, the sorted auxiliary information list 124' can be divided so that the P process units 126-1 to 126-P can effectively and quickly merge the list in parallel. For example, in the example shown in FIGS. 11A to 11C, for the block 1211 with the block identifier #355, records with the minimum sort key value "1023" and the maximum sort key value "1033" are set to the block information records. Thus, the block #355 is not added to the beginning of the second sub-auxiliary information list 125-2. Consequently, one record of the second sub-auxiliary information list 125-2 can be saved.

In addition, the sorting of the records 1211 can be easily performed in the descending order as well as the ascending order.

In the above-mentioned embodiments, it is assumed that all records have different sort key values. However, the present invention can be applied to the case where a plurality of records have the same sort key values as is clear from the above description.

In the above-mentioned embodiments, the present invention is applied to a bus-coupled loose-coupled multi-processor system as a parallel processor system. However, the present invention can be applied to a memory-shared type close-coupled multi-processor system, or a compromised multi-processor system where a shared memory is used and processor module has a local memory.

In addition, the construction of data sequence for the parallel merge and sort process according to the present invention is not limited to a list. Instead, the present invention can be applied to a matrix, a sequential file, and so forth.

As described above, according to the above-mentioned embodiments, when sorted list groups 122-1 to 122-L are generated, an auxiliary information list 124, which is an index of blocks 1241, is generated. The auxiliary information list 124 is sorted corresponding to sort key values of representative records of the blocks 1241. The sorted auxiliary information list 124' is divided into portions equivalent to the number of merge process units 126-1 to 126-P. Thus, P sub-auxiliary information lists 125-1 to 125-P are obtained. Consequently, L sorted merge objective lists 122-1 to 122-L are divided into P segments Seg1 to SegP corresponding to the P sub-auxiliary information lists 125-1 to 125-P. The P process units 126-i (where 1≦i≦P) merge the records in the blocks 1241 of the segment Segi corresponding to the sub-auxiliary information list 125-i allocated thereto. This merge process is performed in parallel by the P process units 126-1 to 126-P.

Thus, the auxiliary information list 124 in the main memory is accessed and the sorted merge objective lists 121-1 to 121-L are divided into segments without need to directly access the sorted merge objective lists 11-1 to 11-3 stored in the secondary memory unit. In addition, the segments Seg1 to SegP are merged in parallel by the P process units 126-1 to 126-P. Thus, the parallel merge process can be performed at high speed.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A merge and sort process method for dividing a data sequence to be sorted into a plurality of sorted data sequences and merging the sorted data sequences, comprising the steps of:

(1) dividing the data sequence to be sorted into L sorted data sequences, each of which is formed of a plurality of blocks where L is any natural number larger than or equal to 2;

(2) generating a block information record for each block in the sorted data sequences, the block information record having identification information of the block and representative data thereof and arranging the block information records so as to generate a first auxiliary information record group;

(3) arranging the block information records of the first auxiliary information record group in a predetermined order corresponding to values of the representative data so as to generate a second auxiliary record group;

(4) dividing the second auxiliary record group into P sub-auxiliary information record groups, each of which has nearly the same number of the block information records where P is any natural number larger than or equal to 2; and (5) allocating the P sub-auxiliary information record groups to a plurality of process units adapted for merging blocks corresponding to the block information records of the sub-auxiliary information record groups of the L sorted data sequences allocated to the process units in parallel and for merging the P sorted data sequences so as to sort the data sequence to be merged in a predetermined order.

2. The parallel merge and sort process method as set forth in claim 1, wherein the step (1) is performed by storing the L sorted data sequences that are an arrangement of blocks in a secondary memory unit, and wherein the step (2) is performed by setting information necessary for accessing a block of the secondary memory unit as block identification information of the block information record and selecting the first data of the block.

3. The parallel merge and sort process method as set forth in claim 2, wherein the block has a fixed length, and wherein the step (2) is performed by setting an identifier as the identification information of the block.

4. The parallel merge and sort process method as set forth in claim 3, wherein the block is a data input/output unit of the secondary memory unit.

5. The parallel merge and sort process method as set forth in claim 2, wherein the block has a variable length, wherein the step (2) is performed by setting information for specifying a storage address of the secondary memory unit for the block as the identification information of the block.

6. The parallel merge and sort process method as set forth in claim 1, wherein the step (5) is performed by allocating the P sub-auxiliary record groups to the P process units adapted for merging the L sorted data sequences corresponding to the sub-auxiliary information record groups allocated thereto in parallel.

7. The parallel merge and sort process method as set forth in claim 1, wherein the data sequence to be sorted is a list of a plurality of records linked, wherein the step (1) is performed by dividing the list to be sorted into L sorted merge objective lists, each of which is formed of a plurality of blocks, wherein the step (2) is performed by generating a block information record for each block of the divided merge objective lists, the block information record having identification information of the block and a representative record of the block so as to generate the first auxiliary information record group formed of the block information records, wherein the step (3) is performed by sorting the information records of all the blocks of the first auxiliary information record group in a predetermined order of values of sort keys so as to generate the second auxiliary information record group, wherein the step (4) is performed by dividing the second auxiliary record group into P sub-auxiliary record groups, each of which has the same number of the block information records, and wherein the step (5) is performed by allocating the P sub-auxiliary record groups to the process units adapted for merging blocks corresponding to the block information records of the sub-auxiliary information record groups of the L sorted merge objective list allocated to the process units in parallel and for merging the P sorted lists so as to sort the data sequence to be merged in a predetermined order.

8. The parallel merge and sort process method as set forth in claim 7, wherein the L sorted lists are divided into blocks and stored in the secondary memory unit, and wherein the block identification information of the block information records of the second auxiliary information record group is information necessary for the secondary memory unit to access a corresponding block, and wherein the sort key value is the value of a key of the first record of the block.

9. The parallel merge and sort process method as set forth in claim 8, wherein all the records of the L sorted lists are sorted in the ascending order of the key values, wherein the step (4) includes (a) dividing the second auxiliary information record group into P sub-auxiliary information record groups, each of which has nearly the same number of the block information records, (b) setting a key value of the first block information record to a forward boundary value of each of the P sub-auxiliary information record groups, (c) setting a key value of the first block information record of the sub-auxiliary information record group to a backward boundary value when the sub-auxiliary information record group is followed by another sub-auxiliary information record group and setting a value larger than the maximum key value of the records of the sort objective list to the backward boundary value when the sub-auxiliary information record group is not followed by another sub-auxiliary information record group, and (d) extracting block information records corresponding to all blocks that may contain records with key values larger than or equal to the forward boundary value of a first sub-auxiliary information record group from a second sub-auxiliary information record group and adding the extracted block information records to the beginning of the first sub-auxiliary information record group when the first sub-auxiliary information record group is preceded by the second sub-auxiliary information record group, and wherein the step (5) is performed by causing each of the process units to merge records of blocks corresponding to the block information records of the sub-auxiliary information record group allocated to the process unit when key values of the records are larger than or equal to the forward boundary value of the sub-auxiliary information record group and less than the backward boundary value thereof.

10. The parallel merge and sort process method as set forth in claim 7, wherein the L sorted lists are divided into blocks and stored in the secondary memory unit, and wherein the block identification information of the block information records of the second auxiliary information record group is information necessary for the secondary memory unit to access a corresponding block, and wherein the sort key value is the value of a key of the last record of the block.

11. The parallel merge and sort process method as set forth in claim 10, wherein the step (4) includes (a) dividing the second auxiliary information record group into P sub-auxiliary information record groups, each of which has nearly the same number of the block information records, (b) setting a key value of the last block information record of the sub-auxiliary information record group to a forward boundary value when the sub-auxiliary information record group is preceded by another sub-auxiliary information record group and setting a value smaller than the minimum key value of the records of the sort objective list to the forward boundary value when the sub-auxiliary information record group is not preceded by another sub-auxiliary information record group, (c) setting a key value of the last block information record to a backward boundary value of each of the P sub-auxiliary information record groups, and (d) extracting block information records corresponding to all blocks that may contain records with key values larger than the forward boundary value and smaller than or equal to the backward boundary value of a first sub-auxiliary information record group from a second sub-auxiliary information record group and adding the extracted block information records to the last of the first sub-auxiliary information record group when the first sub-auxiliary information record group is followed by the second sub-auxiliary information record group, and wherein the step (5) is performed by causing each of the process units to merge records of blocks corresponding to the block information records of the sub-auxiliary information record group allocated to the process unit when key values of the records are larger than the forward boundary value of the sub-auxiliary information record group and less than or equal to the backward boundary value thereof.

12. The parallel merge and sort process method as set forth in claim 7, wherein the step (4) is performed by dividing the second auxiliary information record group into P sub-auxiliary information record groups, each of which has nearly the same number of the block information records, and wherein the step (5) is performed by allocating the P sub-auxiliary information record groups to the P process units adapted for merging segments formed of blocks corresponding to the block information records of the sub-auxiliary information record groups allocated to the process units.

13. The parallel merge and sort process method as set forth in claim 7, wherein the block has a fixed length, and wherein the step (2) is performed by setting an identifier as the identification information of the block.

14. The parallel merge and sort process method as set forth in claim 13, wherein the block is data input/output from the secondary memory unit.

15. A merge and sort process system for dividing a data sequence to be sorted into a plurality of sorted data sequences and merging the sorted data sequences, comprising:

a plurality of process units;

first dividing means for dividing the data sequence to be sorted into L sorted data sequences, each of which is formed of a plurality of blocks where L is any natural number larger than or equal to 2;

first generating means for generating a block information record for each block in the sorted data sequences, the block information record having identification information of the block and representative data thereof and arranging the block information records so as to generate a first auxiliary information record group;

second generating means for arranging the block information records of the first auxiliary information record group in a predetermined order corresponding to values of the representative data so as to generate a second auxiliary record group;

second dividing means for dividing the second auxiliary record group in P sub-auxiliary information record groups, each of which has nearly the same number of the block information records where P is any natural number larger than or equal to 2;

allocating means for allocating the P sub-auxiliary information record groups to said process units; and sorting means for causing said process units to merge blocks corresponding to the block information records of the sub-auxiliary information record groups of the L sorted data sequences allocated to said process units in parallel and for merging the P sorted data sequences so as to sort the merged data sequence in a predetermined order.

16. The parallel merge and sort process system as set forth in claim 15, wherein said dividing means is adapted for storing the L sorted data sequences that are an arrangement of blocks in a secondary memory unit, and wherein said first generating means is adapted for setting information necessary for accessing a block of the secondary memory unit as block identification information of the block information record and selecting the first data of the block.

17. The parallel merge and sort process system as set forth in claim 16, wherein the block has a fixed length, and wherein said first dividing means is adapted for setting an identifier as the identification information of the block.

18. The parallel merge and sort process system as set forth in claim 17, wherein the block is a data input/output unit of the secondary memory unit.

19. The parallel merge and sort process system as set forth in claim 16, wherein the block has a variable length, and wherein said first generating means is adapted for setting information for specifying a storage address of the secondary memory unit for the block as the identification information of the block.

20. The parallel merge and sort process system as set forth in claim 19, wherein said allocating means is adapted for allocating the P sub-auxiliary record groups to the P process units adapted, and wherein said merging means is adapted for causing said process units to merge the L sorted data sequences corresponding to the sub-auxiliary information record groups allocated thereto in parallel.

21. The parallel merge and sort process system as set forth in claim 15, wherein the data sequence to be sorted is a list of a plurality of records linked, wherein said first dividing means is adapted for dividing the list to be sorted into L sorted merge objective lists, each of which is formed of a plurality of blocks, wherein said first generating means is adapted for generating a block information record for each block of the divided merge objective lists, the block information record having identification information of the block and a representative record of the block so as to generate the first auxiliary information record group formed of the block information records, wherein said second generating means is adapted for sorting the information records of all the blocks of the first auxiliary information record group in a predetermined order of values of sort keys so as to generate the second auxiliary information record group, wherein said second dividing means is adapted for dividing the second auxiliary record group into P sub-auxiliary record groups, each of which has the same number of the block information records, wherein said allocating means is adapted for allocating the P sub-auxiliary record groups to said process units, and wherein said merging means is adapted for causing said process units to merge blocks corresponding to the block information records of the sub-auxiliary information record groups of the L sorted merge objective list allocated to said process units in parallel and for merging the P sorted lists so as to sort the data sequence to be merged in a predetermined order.

22. The parallel merge and sort process system as set forth in claim 21,
wherein the L sorted lists are divided into blocks and stored in the secondary memory unit, and
wherein said first generating means is adapted for setting the block identification information of the block information records of the second auxiliary information record group as information necessary for the secondary memory unit to access a corresponding block and setting the sort key value as the value of a key of the first record of the block.

23. The parallel merge and sort process system as set forth in claim 22,
wherein all the records of the L sorted lists are sorted in the ascending order of the key values,
wherein said allocating means includes:
means for dividing the second auxiliary information record group into P sub-auxiliary information record groups, each of which has nearly the same number of the block information records,
means for setting a key value of the first block information record to a forward boundary value of each of the P sub-auxiliary information record groups,
means for setting a key value of the first block information record of the sub-auxiliary information record group to a backward boundary value when the sub-auxiliary information record group is followed by another sub-auxiliary information record group and setting a value larger than the maximum key value of the records of the sort objective list to the backward boundary value when the sub-auxiliary information record group is not followed by another sub-auxiliary information record group, and
means for extracting block information records corresponding to all blocks that may contain records with key values larger than or equal to the forward boundary value of a first sub-auxiliary information record group from a second sub-auxiliary information record group and adding the extracted block information records to the beginning of the first sub-auxiliary information record group when the first sub-auxiliary information record group is preceded by the second sub-auxiliary information record group, and
wherein said merging means is adapted for causing each of said process units to merge records of blocks corresponding to the block information records of the sub-auxiliary information record group allocated to said process unit when key values of the records are larger than or equal to the forward boundary value of the sub-auxiliary information record group and less than the backward boundary value thereof.

24. The parallel merge and sort processing system as set forth in claim 21,
wherein the L sorted lists are divided into blocks and stored in the secondary memory unit, and
wherein said first generating means is adapted for setting the block identification information of the block information records of the second auxiliary information record group as information necessary for the secondary memory unit to access a corresponding block and setting the sort key value as the value of a key of the last record of the block.

25. The parallel merge and sort process system as set forth in claim 24,
wherein said allocating means includes:
means for dividing the second auxiliary information record group into P sub-auxiliary information record groups, each of which has nearly the same number of the block information records,
means for setting a key value of the last block information record of the sub-auxiliary information record group to a forward boundary value when the sub-auxiliary information record group is preceded by another sub-auxiliary information record group and setting a value smaller than the minimum key value of the records of the sort objective list to the forward boundary value when the sub-auxiliary information record group is not preceded by another sub-auxiliary information record group,
means for setting a key value of the last block information record to a backward boundary value of each of the P sub-auxiliary information record groups, and
means for extracting block information records corresponding to all blocks that may contain records with key values larger than the forward boundary value and smaller than or equal to the backward boundary value of a first sub-auxiliary information record group from a second sub-auxiliary information record group and adding the extracted block information records to the end of the first sub-auxiliary information record group when the first sub-auxiliary information record group is followed by the second sub-auxiliary information record group, and
wherein said merging means is adapted for causing each of said process units to merge records of blocks corresponding to the block information records of the sub-auxiliary information record group allocated to said process unit when key values of the records are larger than the forward boundary value of the sub-auxiliary information record group and less than or equal to the backward boundary value thereof.

26. The parallel merge and sort process system as set forth in claim 21,
wherein said second dividing means is adapted for dividing the second auxiliary information record group into P sub-auxiliary information record groups, each of which has nearly the same number of the block information records,
wherein said allocating means is adapted for allocating the P sub-auxiliary information record groups to P process units, and
wherein said merging means is adapted for causing the process units to merge segments formed of blocks corresponding to the block information records of the sub-auxiliary information record groups allocated to the process units.

27. The parallel merge and sort process system as set forth in claim 21,
wherein the block has a fixed length, and
wherein said first generating means is adapted for setting an identifier as the identification information of the block.

28. The parallel merge and sort process system as set forth in claim 27,
wherein the block is data input/output unit of the secondary memory unit.

* * * * *